US010292033B2

(12) United States Patent
Beyer, Jr. et al.

(10) Patent No.: US 10,292,033 B2
(45) Date of Patent: *May 14, 2019

(54) METHOD TO PROVIDE AD HOC AND PASSWORD PROTECTED DIGITAL AND VOICE NETWORKS

(71) Applicant: AGIS Software Development LLC, Marshall, TX (US)

(72) Inventors: Malcolm K. Beyer, Jr., Jupiter, FL (US); Christopher R. Rice, Redmond, WA (US)

(73) Assignee: AGIS SOFTWARE DEVELOPMENT LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,469

(22) Filed: Mar. 24, 2017

(65) Prior Publication Data

US 2017/0201621 A1    Jul. 13, 2017

Related U.S. Application Data

(63) Continuation of application No. 15/287,638, filed on Oct. 6, 2016, now Pat. No. 9,706,381, which is a (Continued)

(51) Int. Cl.
*H04W 4/00* (2018.01)
*H04W 4/90* (2018.01)
(Continued)

(52) U.S. Cl.
CPC .............. *H04W 4/90* (2018.02); *G01S 19/17* (2013.01); *G06F 3/0482* (2013.01);
(Continued)

(58) Field of Classification Search
CPC ...................................... H04W 4/02
See application file for complete search history.

(56) References Cited

U.S. PATENT DOCUMENTS 5,325,310 A    6/1994  Johnson et al.
5,555,286 A    9/1996  Tendler
(Continued)

FOREIGN PATENT DOCUMENTS

EP    1148754 A2    10/2001
EP    1655888 A1    5/2006
(Continued)

OTHER PUBLICATIONS

Batista, E., "Your Boss May Know Where You Are," Wired News, May 31, 2002; 2pgs.
(Continued)

*Primary Examiner* — Omoniyi Obayanju
(74) *Attorney, Agent, or Firm* — Goodwin Procter LLP

(57) ABSTRACT

A method and system includes the ability for individuals to set up an ad hoc digital and voice network easily and rapidly to allow users to coordinate their activities by eliminating the need for pre-entry of data into a web or identifying others by name, phone numbers or email. This method is especially useful for police, fire fighters, military, first responders or other emergency situations for coordinating different organizations at the scene of a disaster to elevate conventional communication problems either up and down the chain of command or cross communication between different emergency units. The method and system provides that the users are only required to enter a specific Server IP address and an ad hoc event name, a password and perhaps the name of the particular unit.

26 Claims, 7 Drawing Sheets

Related U.S. Application Data continuation of application No. 14/529,978, filed on Oct. 31, 2014, now Pat. No. 9,467,838, which is a continuation-in-part of application No. 14/027,410, filed on Sep. 16, 2013, now Pat. No. 8,880,042, which is a continuation of application No. 13/751,453, filed on Jan. 28, 2013, now Pat. No. 8,538,393, which is a continuation-in-part of application No. 12/761,533, filed on Apr. 16, 2010, now Pat. No. 8,364,129, which is a continuation-in-part of application No. 11/615,472, filed on Dec. 22, 2006, now Pat. No. 8,126,441, which is a continuation-in-part of application No. 11/308,648, filed on Apr. 17, 2006, now Pat. No. 7,630,724, which is a continuation-in-part of application No. 10/711,490, filed on Sep. 21, 2004, now Pat. No. 7,031,728.

(51) Int. Cl.

| | | |
|---|---|---|
| *H04W 12/02* | (2009.01) | |
| *H04M 1/2745* | (2006.01) | |
| *H04M 1/725* | (2006.01) | |
| *H04W 4/02* | (2018.01) | |
| *H04W 4/08* | (2009.01) | |
| *H04W 64/00* | (2009.01) | |
| *H04W 84/18* | (2009.01) | |
| *H04L 29/06* | (2006.01) | |
| *H04W 68/00* | (2009.01) | |
| *G06F 3/0482* | (2013.01) | |
| *G06F 3/0484* | (2013.01) | |
| *H04L 29/08* | (2006.01) | |
| *H04W 4/021* | (2018.01) | |
| *H04L 29/12* | (2006.01) | |
| *H04W 68/04* | (2009.01) | |
| *H04W 12/06* | (2009.01) | |
| *H04M 7/00* | (2006.01) | |
| *G01S 19/17* | (2010.01) | |
| *H04M 3/56* | (2006.01) | |
| *H04W 4/14* | (2009.01) | |
| *H04W 76/15* | (2018.01) | |
| *H04W 76/11* | (2018.01) | |
| *H04W 76/50* | (2018.01) | |
| *H04W 12/08* | (2009.01) | |
| *H04W 4/10* | (2009.01) | |
| *H04W 12/04* | (2009.01) | |
| *H04W 84/04* | (2009.01) | |
| *H04W 76/45* | (2018.01) | |

(52) U.S. Cl.
CPC ........ *G06F 3/04842* (2013.01); *H04L 61/605* (2013.01); *H04L 63/065* (2013.01); *H04L 63/083* (2013.01); *H04L 63/104* (2013.01); *H04L 67/18* (2013.01); *H04M 1/27455* (2013.01); *H04M 1/72519* (2013.01); *H04M 1/72536* (2013.01); *H04M 1/72547* (2013.01); *H04M 1/72572* (2013.01); *H04M 1/72583* (2013.01); *H04M 3/56* (2013.01); *H04M 7/006* (2013.01); *H04W 4/02* (2013.01); *H04W 4/021* (2013.01); *H04W 4/023* (2013.01); *H04W 4/026* (2013.01); *H04W 4/027* (2013.01); *H04W 4/08* (2013.01); *H04W 4/14* (2013.01); *H04W 12/02* (2013.01); *H04W 12/06* (2013.01); *H04W 12/08* (2013.01); *H04W 64/00* (2013.01); *H04W 68/00* (2013.01); *H04W 68/04* (2013.01); *H04W 76/11* (2018.02); *H04W 76/15* (2018.02); *H04W 76/50* (2018.02); *H04W 84/18* (2013.01); *H04L 61/2007* (2013.01); *H04M 1/72525* (2013.01); *H04M 2250/10* (2013.01); *H04M 2250/22* (2013.01); *H04M 2250/62* (2013.01); *H04W 4/10* (2013.01); *H04W 12/04* (2013.01); *H04W 76/45* (2018.02); *H04W 84/042* (2013.01)

(56) References Cited

U.S. PATENT DOCUMENTS

| | | | |
|---|---|---|---|
| 5,563,931 | A | 10/1996 | Bishop et al. |
| 5,692,032 | A | 11/1997 | Seppanen |
| 5,742,905 | A | 4/1998 | Pepe et al. |
| 5,764,898 | A | 6/1998 | Tsuji et al. |
| 5,898,434 | A | 4/1999 | Small et al. |
| 6,104,704 | A | 8/2000 | Buhler et al. |
| 6,108,704 | A | 8/2000 | Hutton |
| 6,119,017 | A | 9/2000 | Cassidy et al. |
| 6,128,291 | A | 10/2000 | Perlman et al. |
| 6,148,332 | A | 11/2000 | Brewer |
| 6,182,114 | B1 | 1/2001 | Yap et al. |
| 6,204,844 | B1 | 3/2001 | Fumarolo et al. |
| 6,232,971 | B1 | 5/2001 | Haynes |
| 6,271,835 | B1 | 8/2001 | Hoeksma |
| 6,292,747 | B1 | 9/2001 | Amro et al. |
| 6,366,782 | B1 | 4/2002 | Fumarolo et al. |
| 6,377,210 | B1 | 4/2002 | Moore |
| 6,385,465 | B1 | 5/2002 | Yoshioka |
| 6,434,403 | B1 | 8/2002 | Ausems et al. |
| 6,459,440 | B1 | 10/2002 | Monnes et al. |
| 6,477,387 | B1 | 11/2002 | Jackson et al. |
| 6,487,595 | B1 | 11/2002 | Turunen et al. |
| 6,490,521 | B2 | 12/2002 | Wiener |
| 6,504,503 | B1 | 1/2003 | Saint-Hilaire et al. |
| 6,518,957 | B1 | 2/2003 | Lehtinen et al. |
| 6,542,475 | B1 | 4/2003 | Bala et al. |
| 6,549,768 | B1 | 4/2003 | Fraccaroli |
| 6,654,683 | B2 | 11/2003 | Jin et al. |
| 6,661,353 | B1 | 12/2003 | Gopen |
| 6,662,016 | B1 | 12/2003 | Buckham et al. |
| 6,665,293 | B2 | 12/2003 | Thornton et al. |
| 6,697,734 | B1 | 2/2004 | Suomela |
| 6,700,589 | B1 | 3/2004 | Canelones et al. |
| 6,704,303 | B1 | 3/2004 | Bowman-Amuah |
| 6,716,101 | B1 | 4/2004 | Meadows et al. |
| 6,772,142 | B1 | 8/2004 | Kelling et al. |
| 6,775,560 | B2 | 8/2004 | King et al. |
| 6,816,878 | B1 | 11/2004 | Zimmers et al. |
| 6,854,007 | B1 | 2/2005 | Hammond |
| 6,867,733 | B2 | 3/2005 | Sandhu et al. |
| 6,868,333 | B2 | 3/2005 | Melen |
| 6,868,337 | B2 | 3/2005 | Muramatsu |
| 6,882,856 | B1 | 4/2005 | Alterman et al. |
| 6,885,874 | B2 | 4/2005 | Grube et al. |
| 6,941,127 | B2 | 9/2005 | Muramatsu |
| 7,002,952 | B2 | 2/2006 | Jones |
| 7,024,207 | B2 | 4/2006 | Gorday et al. |
| 7,031,700 | B2 | 4/2006 | Weaver et al. |
| 7,031,728 | B2 | 4/2006 | Beyer, Jr. |
| 7,039,040 | B1 | 5/2006 | Burg |
| 7,103,333 | B2 | 9/2006 | Lazaridis et al. |
| 7,158,878 | B2 | 1/2007 | Rasmussen et al. |
| 7,194,083 | B1 | 3/2007 | Tischer et al. |
| 7,219,303 | B2 | 5/2007 | Fish |
| 7,271,742 | B2 | 9/2007 | Sheha et al. |
| 7,292,935 | B2 | 11/2007 | Yoon |
| 7,299,075 | B2 | 11/2007 | Gottlieb et al. |
| 7,330,112 | B1 | 2/2008 | Emigh et al. |
| 7,353,034 | B2 | 4/2008 | Haney |
| 7,386,589 | B1 | 6/2008 | Tanumihardja et al. |
| 7,398,551 | B2 | 7/2008 | Thomas et al. |
| 7,421,270 | B2 * | 9/2008 | Serafat .................. H04W 8/22 455/419 |
| 7,426,202 | B2 | 9/2008 | Warner et al. |
| 7,450,003 | B2 | 11/2008 | Weber et al. |
| 7,454,233 | B2 | 11/2008 | Lu et al. |
| 7,474,627 | B2 | 1/2009 | Chheda et al. |

(56) References Cited

U.S. PATENT DOCUMENTS

| | | |
|---|---|---|
| 7,486,648 B1 | 2/2009 | Baranowski |
| 7,499,799 B2 | 3/2009 | Park |
| 7,574,353 B2 | 8/2009 | Trombetta et al. |
| 7,593,740 B2 | 9/2009 | Crowley et al. |
| 7,609,669 B2 | 10/2009 | Sweeney et al. |
| 7,619,584 B2 | 11/2009 | Wolf |
| 7,630,724 B2 | 12/2009 | Beyer, Jr. et al. |
| 7,633,898 B2 | 12/2009 | Jain et al. |
| 7,672,681 B1 | 3/2010 | Beyer |
| 7,689,232 B1 | 3/2010 | Beyer |
| 7,764,954 B2 | 7/2010 | Beyer, Jr. |
| 7,801,134 B2 | 9/2010 | Hori et al. |
| 7,801,781 B2 | 9/2010 | Olin et al. |
| 7,805,146 B1 | 9/2010 | Beyer |
| 7,848,765 B2 | 12/2010 | Phillips et al. |
| 7,853,273 B2 | 12/2010 | Beyer |
| 7,912,913 B2 | 3/2011 | Accapadi et al. |
| 7,917,866 B1 | 3/2011 | Karam |
| 8,000,724 B1 | 8/2011 | Rayburn |
| 8,014,763 B2 | 9/2011 | Hymes |
| 8,078,164 B2 | 12/2011 | Ganesan |
| 8,126,441 B2 | 2/2012 | Beyer, Jr. |
| 8,139,514 B2 | 3/2012 | Weber et al. |
| 8,213,970 B2 | 7/2012 | Beyer |
| 8,250,155 B2 | 8/2012 | Corry et al. |
| 8,300,644 B2 | 10/2012 | Gilbert et al. |
| 8,364,129 B1 | 1/2013 | Beyer, Jr. |
| 8,369,843 B2 | 2/2013 | Fux et al. |
| 8,538,393 B1 | 9/2013 | Beyer, Jr. et al. |
| 8,549,285 B2 | 10/2013 | Fink et al. |
| RE44,716 E | 1/2014 | Vaziri et al. |
| 8,713,302 B1 | 4/2014 | Kirchhoff |
| 8,731,158 B2 | 5/2014 | Donovan |
| 8,781,089 B2 | 7/2014 | Gilboa et al. |
| 8,792,479 B2 | 7/2014 | Bender et al. |
| 8,880,042 B1 | 11/2014 | Beyer, Jr. et al. |
| 8,982,876 B2 | 3/2015 | Kundaje et al. |
| 9,019,946 B1 | 4/2015 | Rao et al. |
| 9,408,055 B2 | 8/2016 | Beyer, Jr. |
| 9,445,251 B2 | 9/2016 | Beyer, Jr. et al. |
| 9,467,838 B2 | 10/2016 | Beyer, Jr. et al. |
| 9,544,271 B2 | 1/2017 | McFarland et al. |
| 9,706,381 B2 | 7/2017 | Beyer, Jr. et al. |
| 9,749,829 B2 | 8/2017 | Beyer, Jr. et al. |
| 9,820,123 B2 | 11/2017 | Beyer, Jr. et al. |
| 2001/0026609 A1 | 10/2001 | Weinstein et al. |
| 2001/0044321 A1 | 11/2001 | Ausems et al. |
| 2002/0027901 A1 | 3/2002 | Liu et al. |
| 2002/0064147 A1 | 5/2002 | Jonas et al. |
| 2002/0115450 A1 | 8/2002 | Muramatsu |
| 2002/0115453 A1 | 8/2002 | Poulin et al. |
| 2002/0135615 A1 | 9/2002 | Lang |
| 2002/0173906 A1 | 11/2002 | Muramatsu |
| 2002/0194378 A1 | 12/2002 | Foti |
| 2003/0013461 A1 | 1/2003 | Mizune et al. |
| 2003/0081011 A1 | 5/2003 | Sheldon et al. |
| 2003/0093405 A1 | 5/2003 | Mayer |
| 2003/0100326 A1* | 5/2003 | Grube ............... H04W 84/08 455/515 |
| 2003/0103072 A1 | 6/2003 | Ko |
| 2003/0103088 A1 | 6/2003 | Dresti et al. |
| 2003/0114171 A1 | 6/2003 | Miyamoto |
| 2003/0128195 A1 | 7/2003 | Banerjee et al. |
| 2003/0139150 A1 | 7/2003 | Rodriguez et al. |
| 2003/0149527 A1 | 8/2003 | Sikila |
| 2003/0200259 A1 | 10/2003 | Tsuge |
| 2003/0217109 A1 | 11/2003 | Ordille et al. |
| 2003/0224762 A1 | 12/2003 | Lau et al. |
| 2003/0229441 A1 | 12/2003 | Pechatnikov |
| 2004/0054428 A1* | 3/2004 | Sheha ............... G01C 21/3664 700/56 |
| 2004/0137884 A1 | 7/2004 | Engstrom et al. |
| 2004/0143391 A1 | 7/2004 | King et al. |
| 2004/0148090 A1 | 7/2004 | Melen |
| 2004/0157590 A1 | 8/2004 | Lazaridis et al. |
| 2004/0192299 A1 | 9/2004 | Wilson et al. |
| 2004/0204070 A1 | 10/2004 | August et al. |
| 2004/0213215 A1 | 10/2004 | Kakiuchi |
| 2004/0243710 A1 | 12/2004 | Mao |
| 2004/0252050 A1 | 12/2004 | Tengler et al. |
| 2004/0266456 A1 | 12/2004 | Bostrom et al. |
| 2005/0027705 A1 | 2/2005 | Sadri et al. |
| 2005/0030977 A1 | 2/2005 | Casey et al. |
| 2005/0060069 A1 | 3/2005 | Breed et al. |
| 2005/0113123 A1 | 5/2005 | Torvinen |
| 2005/0130634 A1 | 6/2005 | Godfrey |
| 2005/0130666 A1 | 6/2005 | Levy et al. |
| 2005/0221876 A1 | 10/2005 | Van Bosch et al. |
| 2005/0227705 A1 | 10/2005 | Rousu et al. |
| 2005/0246419 A1 | 11/2005 | Jaatinen |
| 2005/0265256 A1 | 12/2005 | Delaney |
| 2005/0270311 A1* | 12/2005 | Rasmussen ............ G01C 21/32 345/677 |
| 2006/0015407 A1 | 1/2006 | Bernard et al. |
| 2006/0030339 A1 | 2/2006 | Zhovnirovsky et al. |
| 2006/0031927 A1 | 2/2006 | Mizuno et al. |
| 2006/0035647 A1 | 2/2006 | Eisner et al. |
| 2006/0039353 A1 | 2/2006 | Samuel et al. |
| 2006/0047825 A1 | 3/2006 | Steenstra et al. |
| 2006/0155871 A1 | 7/2006 | Ilkka et al. |
| 2006/0178128 A1 | 8/2006 | Eaton |
| 2006/0218232 A1 | 9/2006 | Kubala et al. |
| 2007/0047707 A1 | 3/2007 | Mayer et al. |
| 2007/0081649 A1 | 4/2007 | Baudino |
| 2007/0150444 A1 | 6/2007 | Chesnais et al. |
| 2007/0153986 A1 | 7/2007 | Bloebaum et al. |
| 2007/0178912 A1 | 8/2007 | Baranowski |
| 2007/0200713 A1 | 8/2007 | Weber et al. |
| 2007/0218885 A1 | 9/2007 | Pfleging et al. |
| 2007/0281689 A1 | 12/2007 | Altman et al. |
| 2007/0281690 A1 | 12/2007 | Altman et al. |
| 2008/0132243 A1 | 6/2008 | Spalink et al. |
| 2008/0219416 A1 | 9/2008 | Roujinsky |
| 2008/0304460 A1 | 12/2008 | Thermond |
| 2010/0052945 A1 | 3/2010 | Breed |
| 2010/0125636 A1 | 5/2010 | Kuhlke et al. |
| 2011/0053554 A1 | 3/2011 | Wong et al. |
| 2012/0008526 A1 | 1/2012 | Borghei |
| 2013/0183949 A1 | 7/2013 | Sulmar |
| 2015/0067055 A1 | 3/2015 | Khera et al. |
| 2015/0264167 A1 | 9/2015 | Beyer, Jr. et al. |
| 2015/0319789 A1 | 11/2015 | Beyer, Jr. et al. |
| 2016/0021522 A1 | 1/2016 | Beyer, Jr. et al. |
| 2016/0057598 A1 | 2/2016 | Beyer, Jr. et al. |
| 2017/0026815 A1 | 1/2017 | Beyer, Jr. et al. |
| 2017/0238158 A1 | 8/2017 | Beyer, Jr. |
| 2018/0027111 A1 | 1/2018 | Beyer, Jr. et al. |
| 2018/0152556 A1 | 5/2018 | Beyer, Jr. et al. |

FOREIGN PATENT DOCUMENTS

| | | |
|---|---|---|
| EP | 1874021 A1 | 1/2008 |
| EP | 2348423 A2 | 7/2011 |
| JP | H04 358448 A | 12/1992 |
| JP | H05 303335 A | 11/1993 |
| JP | H08-5394 A | 1/1996 |
| JP | H09-113288 A | 5/1997 |
| JP | 2000-357296 A | 12/2000 |
| JP | 2002077372 A | 3/2002 |
| JP | 2002-245336 A | 8/2002 |
| JP | 2002-277256 A | 9/2002 |
| JP | 2003139546 A | 5/2003 |
| JP | 2003230172 A | 8/2003 |
| JP | 2003264861 A | 9/2003 |
| JP | 2007532560 A | 11/2007 |
| WO | WO-2002/17567 A2 | 2/2002 |
| WO | WO-200137532 A3 | 4/2002 |
| WO | WO-2003/071825 A1 | 8/2003 |
| WO | WO-03/074973 A2 | 9/2003 |
| WO | WO-2003/096660 A1 | 11/2003 |
| WO | WO-2008/030702 A2 | 3/2008 |
| WO | WO-2008027891 A2 | 3/2008 |
| WO | WO-2008/118878 A2 | 10/2008 |

(56) References Cited

FOREIGN PATENT DOCUMENTS

OTHER PUBLICATIONS

Benefon ESC! GSM + GPS Personal Navigation Phone, 1999, Benefon Oyj, Salo, Finland; 4pgs.
Edlund, T. and Ciber, S., "Mobile Services for Truck Drivers," Master Thesis in Mobile Informatics, IT University of Goleborg, Sweden; 2003; 50pgs.
Garmin rino 110 2-way Radio & Personal Navigator; Owner's Manual and Reference Guide; Apr. 2003; 88pgs.
Gate5, "Mobile Community Solution: Context-sensitive Application Suite for Mobile Communities," 2002; 3pgs.
Gate5, "Mobile Guide Solution: Context-sensitive Applications for PDA-based Mobile City and Travel Guides," 2002; 4pgs.
Int'l Preliminary Report on Patentability (IPRP); for Int'l Patent App. No. PCT/JP2004/000250 dated Jul. 5, 2005; 4pgs.
Kim, R., "Find Friends by Cell Phone/Loop! Application's GPS Program Can Beam Map Location," SFGate; Nov. 14, 2006; 2pgs.
Life360's Rule 50(a) Motion for Judgment as a Matter of Law; AGIS, Inc. v. Life360, Inc. (S.D. Fl.); Mar. 12, 2015; 27pgs.
LocatioNet LBS Applications: MyMap description web page, published before 2004 upon information and belief; 13pgs.
LocatioNet Press Release: "LocatioNet Releases Ground Breaking Mass Market LBS Application Suite—LocatioNet MyMap," Mobile Location Services Congress; May 6, 2003; 2pgs.
Luna, L., "This Man Knows You Live . . . and Work and Play," Wireless Review; Sep. 1, 2002; pp. 24-32.
Meggers, J. and Sang-Bum Parl, A, "A Multimedia Communication Architecture for Handheld Devices," IEEE Paper 0-7803-4872-9/ 98, Sep. 8-11, 1998; pp. 1245-1249.
Memory Map Remote Tracking, available on the Internet at https://web.archive.org/web/20060202161013/hltp:I/memory-map.com/; 2pgs.
Plaintiff Advanced Ground Information Systems, Inc.'s Motions in Limine; AGIS, Inc. v. Life360, Inc. (S.D. Fl.); Feb. 19, 2015; 54pgs.
PRNewswire, "Trimble GPS Technology Enables Seiko Epson; Communication Device and Wireless Data Service," accessed on the internet at: http://www.printthis.clickability.com/pt/cpt?expire=&title=Trimble+GPS+Technology+Enables+Seiko+Epson+Communication+Device+and+Wireless+Data+S . . . ; downloaded Jun. 16, 2016; 4pgs.
The Gate5 system, which, upon information and belief, was sold and/or publicly used within the U.S. prior to 2004 and at least as early as 2002.
The LocatioNet system which, upon information and belief, was sold and/or publically used within the U.S. prior to 2004 and at least as early as 2003; 6pgs.
Östman, L., "A Study of Location-Based Services Including a Design and Implementation of an Enhanced Friend Finder Client with Mapping Capabilities," Lulea Tekniska Univeritet; Aug. 31, 2001; 63pgs.
Batayneh, Fand A., Location Management in Wireless Data Networks. Apr. 21, 2006, 24pgs. Available on the Internet at https://www.cse.wustl.edu/~jain/cse574-06/ftp/wireless_location/index.html.
Ramjee, et al. IP-Based Access Network Infrastructure for Next-Generation Wireless Data Networks. IEEE Personal Communications, Aug. 2000. 8 pgs.
Toppila, Pekka. TCP/IP in Cellular Mobile Environment. 1999, 7pgs.
IBM, Transmission Control Protocol / Internet Protocol. 2pgs. Available on the Internet at www.ibm.com/support/knowledgecenter/en/ssw_aix_61/com.ibm.aix.networkcomm/tcpip_intro.htm.
Microsoft Corporation. Communication Services and Networking (Windows CE 5.0). 2006, 6pgs. Available on the Internet at https://msdn.microsoft.com/en-us/library/ms880996.aspx.
Zetter, Kim. How Attackers Can Use Radio Signals and Mobile Phones to Steal Protected Data. WIRED, Nov. 3, 2004. 5pgs. Available on the Internet at www.wired.com/2014/11/airhopper-hack/.
Kutscher, Dirk et al. Drive-thru Internet: IEEE 802.11b for "Automobile" Users. IEEE Infocom, Mar. 7, 2004. 12pgs.
DIGI, Remote Cellular TCP/IP to Rockwell Ethernet and Serial Devices. 37pgs.
"911 and E911 Services," Federal Communications Commission, updated Mar. 1, 2018, available at https://www.fcc.gov/general/9-1-1-and-e9-1-1-services (last visited May 7, 2018) (6 pages).
"Cellular Mobile Pricing Structures and Trends," Organisation for Economic Co-operation and Development, Working Party on Telecommunications and Information Service Policies, May 16, 2000 (103 pages).
Chen, Ching-Chen et al. "Automatically and Accurately Conflating Satellite Imagery and Maps," In Proceedings of the International Workshop on Next Generation Geospatial Information, Oct. 2003 (4 pages).
Christie, Jock et al. "Development and Deployment of GPS Wireless Devices for E911 and Location Based Services," Position, Location and Navigation Symposium, Palm Springs California, Apr. 15-18, 2002 (6 pages).
Durso, Fred. "A Decade of Difference," NFPA Journal, Sep. 1, 2011, available at https://www.nfpa.org/News-and-Research/Publications/NFPA-Journal/2011/September-October-2011/Features/A-Decade-of-Difference (6 pages).
"Fact Sheet: FCC Wireless 911 Requirements," Federal Communications Commission, January 2001, available at https://transition.fcc.gov/pshs/services/911-services/enhanced911/archives/factsheet_requirements_012001.pdf (4 pages).
Grier, Robin. "VoIP—How to Use It to Cut Costs and Enhance Radio Access," Radio Resource Magazine, Jul. 2000 (4 pages).
Hatfield, Dale N. "A Report on Technical and Operational Issues Impacting the Provision of Wireless Enhanced 911 Services," provided to the Federal Communications Commission on Oct. 15, 2002, (54 pages).
Klabunde, Tim. "The Benefits of a VoIP Dispatch System," Mission Critical Communications, Aug. 2004 (3 pages).
McKinsey & Company. Untitled Report, 2002 (133 pages).
Mock, John H. et al. "A voice over IP solution for mobile radio interoperability," In Proceedings of IEEE 56th Vehicular Technology Conference, Sep. 2002 (4 pages).
Perkins, Charles E. "Ad Hoc Networking, An Introduction," Nokia Research Center, Nov. 28, 2000 (28 pages).
Rashbaum, William K. "Report on 9/11 Finds Flaws in Response of Police Dept," Jul. 27, 2002, available at https://www.nytimes.com/2002/07/27/nyregion/report-on-9-11-finds-flaws-in-response-of-police-dept.html (4 pages).
Rotondo, Rick. "Locate—Track—Extract, Wireless Mesh Networking Allows Commanders to Keep Track of Firefighters at an Incident Scene," Public Safety Report, Mar. 2004 (3 pages).
Sharp, Duncan Scott. "Adapting Ad Hoc Network Concepts to Land Mobile Radio Systems," Thesis, Master of Engineering, University of Alberta, copyright Dec. 2002 (98 pages).
Subbarao, Madhavi. "Mobile Ad Hoc Data Networks for Emergency Preparedness Telecommunications—Dynamic Power-Conscious Routing Concepts," Wireless Communications Technologies Group, Submitted as an interim project report on Feb. 1, 2000 (16 pages).
Definition of "Subnetting," Techopedia, available at https://www.techopedia.com/definition/28328/subnetting as of May 10, 2018 (2 pages).
Trupiano, Michael. "A Taxonomy for Assessing Fitness of Mobile Data Services in US Consumer Markets," Thesis, Master of Engineering, submitted to Massachusetts Institute of Technology on Feb. 1, 2001 (105 pages).
"Voice Over Internet Protocol (VoIP)," Federal Communications Commission, publication date unknown, updated at least as recently as May 13, 2009, available at https://www.fcc.gov/general/voice-over-internet-protocol-voip (last visited May 10, 2018) (11 pages).
Vriendt, Johan De. et al. "Mobile Network Evolution: A Revolution on the Move," IEEE Communications Magazine, Apr. 2002 (8 pages).
"Simon Says 'Here's How!' Simon Mobile Communications Made Simple," Simon Users Manual, IBM Corp., copyright 1994 (41 pages).

(56) References Cited

OTHER PUBLICATIONS

"History of Mobile Phones," Wikipedia, https://en.wikipedia.org/wiki/History_of_Mobile_phones (last visited May 10, 2018) (14 pages).
Apple Newton, Wikipedia, https://en.wikipedia.org/wiki/Apple_Newton (last visited May 10, 2018) (10 pages).
"Email," Wikipedia, https://en.wikipedia.org/wiki/Email (last visited May 10, 2018) (19 pages).
Ion, Florence. "From touch displays to the Surface: A brief history of touchscreen technology," Arstechnica, https://arstechnica.com/gadgets/2013/04/from-touch-displays-to-the-surface-a-brief-history-of-touchscreen-technology/, Apr. 4, 2013 (22 pages).
"Palm VII," Wikipedia, https://en.wikipedia.org/wiki/Palm_VII (last visited May 10, 2018) (2 pages).
IPR2018-01079, Petition for Inter Partes Review of U.S. Pat. No. 8,213,970, filed on behalf of Google, LLC, May 15, 2018 (89 pages).
IPR2018-01080, Petition for Inter Partes Review of U.S. Pat. No. 9,408,055, filed on behalf of Google LLC, May 15, 2018 (87 pages).
IPR2018-01081, Petition for Inter Partes Review of U.S. Pat. No. 9,445,251, filed on behalf of Google, LLC, May 15, 2018 (64 pages).
IPR2018-01082, Petition for Inter Partes Review of U.S. Pat. No. 9,445,251, filed on behalf of Google, LLC, May 15, 2018 (72 pages).
IPR2018-01083, Petition for Inter Partes Review of U.S. Pat. No. 9,445,251, filed on behalf of Google, LLC, May 15, 2018 (72 pages).
IPR2018-01084, Petition for Inter Partes Review of U.S. Pat. No. 9,445,251, filed on behalf of Google, LLC, May 15, 2018 (82 pages).
IPR2018-01085, Petition for Inter Partes Review of U.S. Pat. No. 9,467,838, filed on behalf of Google, LLC, May 15, 2018 (76 pages).
IPR2018-01086, Petition for Inter Partes Review of U.S. Pat. No. 9,467,838, filed on behalf of Google, LLC, May 15, 2018 (82 pages).
IPR2018-01087, Petition for Inter Partes Review of U.S. Pat. No. 9,467,838, filed on behalf of Google, LLC, May 15, 2018 (76 pages).
IPR2018-01088, Petition for Inter Partes Review of U.S. Pat. No. 9,467,838, filed on behalf of Google, LLC, May 15, 2018 (83 pages).
IPR2018-00817, Petition for Inter Partes Review of U.S. Pat. No. 9,445,251, filed on behalf of Apple Inc., Mar. 22, 2018 (85 pages).
IPR2018-00818, Petition for Inter Partes Review of U.S. Pat. No. 9,408,055, filed on behalf of Apple, Inc., Mar. 22, 2018 (86 pages).
IPR2018-00819, Petition for Inter Partes Review of U.S. Pat. No. 9,467,838, filed on behalf of Apple, Inc., Mar. 22, 2018 (91 pages).
IPR2018-00821, Petition for Inter Partes Review of U.S. Pat. No. 8,213,970, filed on behalf of Apple, Inc., Mar. 22, 2018 (85 pages).
AGIS, "Track and Collaborate with Your Entire Team," available as of Jul. 10, 2007 according to Wayback Machine Internet Archive Record, obtained from: http://web.archive.org/web/20070710225045/http://www.agisinc.com/Business.asp (2 pages).
AGIS, "Mobile Social Networking," available as of Jul. 10, 2007 according to Wayback Machine Internet Archive Record, obtained from: http://web.archive.org/web/20070710224939/http://www.agisinc.com/Social Networking.asp (1 page).
AGIS, "AGIS First Responders, Mobile Online Group Collaboration," available as of Jul. 10, 2007 according to Wayback Machine Internet Archive Record, obtained from: https://web.archive.org/web/20070710230256/http://www.agisinc.com/FirstResponders.asp (2 pages).
AGIS, "Frequently Asked Questions About AGIS," available as of Jul. 10, 2007 according to Wayback Machine Internet Archive Record, obtained from: https://web.archive.org/web/20070710224856/http://www.agisinc.com/Faq.asp (3 pages).
"AGIS Mobile Communication & Collaboration Software Being Used by Naval Coastal Warfare Squadron," available as of Aug. 7, 2007 according to Wayback Machine Internet Archive Record, obtained from: https://web.archive.org/web/20070807202431/http://www.agisinc.com/AGIS_US_Navy_photofeature.pdf (2 pages).
"AGIS Introduces Landmark Mobile Networking," dated Jun. 18, 2007, available as of Aug. 7, 2007 according to Wayback Machine Internet Archive Record, obtained from: https://web.archive.org/web/20070807202449/http://www.agisinc.com/AGIS_announcement.pdf (3 pages).
Simon, S. "The Pocket PC Goes Tactical," Law Enforcement Technology, May 2006, obtained from: https://web.archive.org/web/20070807202413/http://www.agisinc.com/Eprint_AGIS_4pg.pdf (4 pages).
*Curriculum Vitae* of William Griswold, available at: https://cseweb.ucsd.edu/~wgg/CV.pdf (29 pages). No Date.
Griswold, W. et al. "Using Mobile Technology to Create Opportunistic Interactions on a University Campus," Technical Report CS2002-0724, University of California at San Diego, Sep. 2002, available at: http://citeseerx.ist.psu.edu/viewdoc/download?doi=10.1.1.14.8249&rep=rep1&type=pdf (6 pages).
Griswold, W. et al. "ActiveCampus—Experiments in Community-Oriented Ubiquitous Computing," University of California at San Diego, published no later than Oct. 2004, available at https://cseweb.ucsd.edu/~wgg/Abstracts/ac-handhelds.pdf (8 pages).
Griswold, W. et al. "Active Campus—Sustaining Educational Communities through Mobile Technology," Technical Report CS2002-0714, University of California at San Diego, Jul. 2002, available at: https://pdfs.sematicsscholar.org/2de1/e05b22889171425bca873a66fd9f19ecda0c.pdf (19 pages).
Baard, M. "A Connection in Every Spot," Wired News, Oct. 16, 2003, available at: https://web.archive.org/web/20031127042047/http://www.wired.com:80/news/print/0,1294,60831,00.html (3 pages).
Cohen, Deborah. "Digital note-passing gains respect among adults," USAToday.com, Nov. 26, 2004, available at: https://usatoday30.usatoday.com/tech/products/services/2004-11-26-im-gains-cred_x.htm (2 pages).
"USCD Active Campus," available as of Aug. 29, 2004 according to Wayback Machine Internet Archive Record, obtained from: https://web.archive.org/web/20040829191734/http://activecampus.ucsd.edu/ (3 pages).
Active Campus, "New Features in Active Campus (Apr. 2003)," available as of Sep. 1, 2006 according to Wayback Machine Internet Archive Record, obtained from: https://web.archive.org/web/20060901101253/https://activecampus.ucsd.edu/new-features.php (3 pages).
"UCSD ActiveCampus," available as of Feb. 6, 2003 according to Wayback Machine Internet Archive Record, obtained from: https://web.archive.org/20030206012106/http://activecampus.ucsd.edu/ (3 pages).
Active Campus, "ActiveCampus—Sustaining Educational Communities through Mobile Technology," copyright 2002, available as of Nov. 25, 2004 according to Wayback Machine Internet Archive Record, obtained from: https://web.archive.org/web/20041125060305/http://activecampus.edu:80/slides/active-campus-hpl (35 pages).
APRS Working Group. "Automatic Position Reporting System: APRS Protocol Reference, Protocol Version 1.0," Aug. 29, 2000, available at: http:/studylib.net/doc/18674143/aprs-protocol-specification (128 pages).
Bruninga, B. "APRS Spec Addendum 1.1," publication date unknown, available at: http://www.aprs.org/aprs11.html (4 pages). Nov. 28, 2017.
Carter, J. "Build an APRS Encoder Tracker," QST, Feb. 2002 (5 pages).
Horzepa, S. "High-Speed Digital and Multimedia Working Group Is On," QST, Jun. 2002 (1 page).
Lehman, J. "ARPS and Search and Rescue—Part 2," QST, Oct. 2003 (3 pages).
Lehman, J. "APRS and Search and Rescue," QST, Sep. 2003 (3 pages).
Horzepa, S. "APRS: Moving Hams on Radio and the Internet; A Guide to the Automatic Reporting System," The American Radio Relay League, Inc., copyright 2004 (156 pages).
Bruninga, B. "Cellular Automatic Position Reporting System (APRS)", dated Jul. 7, 1999, available as of Jul. 25, 2004 according to

(56) References Cited

OTHER PUBLICATIONS

Wayback Machine Internet Archive Record, obtained from: https://web.archive.org/web/20040725024219/http://web.usna.navy.mil:80/~bruninga/APRS-docs/Cellular.Txt (1 page).
Bruninga, B. "Potential APRS Map of JOTA Contacts," publication date unknown, obtained from: http://www.aprs.org/cgsrvr.html (last visited Nov. 28, 2017) (4 pages).
Bruninga, B. "Generic Callsigns for National APRS Events," dated Oct. 20, 2005, available at: http://aprs.org/aprs-jota.txt (1 page).
Bruninga, B. "Tips for Mobile APRS Users," dated Jan. 2, 2004, available as of Jul. 25, 2004 according to Wayback Machine Internet Archive Record, obtained from: https://web.archive.org/web/20040725035443/http://web.usna.navy.mil:80/~bruninga/APRS-docs/MOBILE.TXT (4 Pages).
Bruninga, B. "Automatic Packet/Position Reporting System (APRS)," dated Sep. 18, 2002, available at: http://aprs.org/APRS-docs/APRS.TXT (6 pages).
Bruninga, B. "Touch Screen Display mods in APRStch.EXE," dated Apr. 17, 2000, available as of Jul. 25, 2004 according to Wayback Machine Internet Archive Record, obtained from: https://web.archive.org/web/20040725034727/http:web.usna.navy.mil:80/~bruninga/APRS-docs/TOUCH.TXT (2 pages).
Bruninga, B. "APRS Tiny Web Pages," Sep. 2000, available at: http://aprs.org/TWP.html (7 pages).
Charny, B. "Find a Wireless Friend—for a fee," Cnet, Jun. 24, 2002, available at: https://www.cnet.com/news/find-a-wireless-friend-for-a-fee/ (2 pages).
Charny, B. "New cell feature helps find friends," Cnet, Jun. 25, 2002, available at: https://www.cnet.com/news/new-cell-feaure-helps-find-friends/ (5 pages).
"mMode Features: Find Friends," AT&T Wireless, available as of Jun. 18, 2003 according to Wayback Machine Internet Archive Record, obtained from: https://web.archive.org/20030618175223/http://www.attwireless.com:80/mmode/features/findit/FindFriends/ (2 pages).
Vogiazou, Y. et al. "From Buddyspace to CitiTag: Large-Scale Symbolic Presence for Community Building and Spontaneous Play," Tech Report KMi-04-25, dated Nov. 2004 (8 pages).
Vogiazou, Y. et al. "BuddySpace: Large-Scale Presence for Communities at Work and Play," Tech Report KMi-03-14, dated Sep. 2003 (8 pages).
Eisenstadt, M. et al. "BuddySpace: Enhanced Presence Management for Collaborative Learning, Working, Gaming and Beyond," submitted to JabberCon Europe 2002, publication date unknown, available at: https://pdfs.semanticsscholar.org/8f3d/d07b4e9f3095b949e78de9a2be439e98e663.pdf (6 pages).
Bachler, M. et al. "Collaboration in the Semantic Grid: a Basis for e-Learning," publication date unknown, available at: http://oro.open.ac.uk/6202/1/aai_coakting-2005-preprint-krp.pdf (19 pages).
"Introduction & Philosophy: Presence in a Nutshell," publication date unknown, available at: http://projects.kmi.open.ac.uk/buddyspace/intro-philosophy.html (3 pages). Nov. 8, 2017.
"BuddySpace Downloads," dated May 1, 2007, publication date unknown, available at: http://projects.kmi.open.ac.uk/buddyspace/downloads/downloads.html (3 pages).
"Frequently Asked Questions," BuddySpace.org, available as of Apr. 23, 2007 according to Wayback Machine Internet Archive Record, obtained from: https://web.archive.org/web/20070423184018/http://kmi.open.ac.uk:80/projects/buddyspace/faq.html (11 pages).
"Frequently Asked Questions," BuddySpace.org, available as of Feb. 3, 2004 according to Wayback Machine Internet Archive Record, obtained from: https://web.archive.org/web/20040204032758/http://kmi.open.ac.uk:80/projects/buddyspace/faq.html (4 pages).
"How It Works: The Navizon Wireless Positioning System," Navizon.com, available as of Feb. 19, 2006 according to Wayback Machine Internet Archive Record, obtained from: https://web.archive.org/web/20060219075647/http://www.navizon.com:80/FullFeatures.htm (8 pages).
Shareloc's Blog. "In Case You Were Wondering, We've Been Working . . . ," Navizon.com, available as of Feb. 20, 2006 according to Wayback Machine Internet Archive Record, obtained from: https://web.archive.org/web/20060220062317/http://navizon.typepad.com:80/ (7 pages).
"Navizon: The first Peer-to-Peer Wireless Positioning System that successfully blends GPS +WiFi+ Celluar signals together into one accurate and powerful Mobile Geo-Location System," Navizon.com, available as of Dec. 18, 2005 according to Wayback Machine Internet Archive Record, obtained from: https://web.archive.org/web/20051218105454/http://www.navizon.com:80/index.htm (2 pages).
Conatser, J. et al. "Force XXI Battle Command Brigade and Below-Blue Force Tracking (FBCB2-BFT). A Case Study in the Accelerated Acquisition of a Digital Command and Control System during Operations Enduring Freedom and Iraqi Freedom," dated Dec. 2005, available at www.dtic.mil/dtic/tr/fulltext/u2/a443273.pdf (73 pages).
Dunn, R.J. III. "Blue Force Tracking: The Afghanistan and Iraq Experience and Its Implications for the U.S. Army," Northrop Grumman, 2003, available at: http://www.northropgrumman.com/AboutUs/AnalysisCenter/Documents/pdfs/BFT-Afghanistan-and-Iraq-Exper.pdf (20 pages).
"Force XXI Battle Command, Brigade and Below (FBCB2)," available as of Feb. 4, 2017 according to Wayback Machine Internet Archive Record, obtained from: https://web.archive.org/web/20170204113146/http://www.dote.osd.mil/pub/reports/FY1999/pdf/army/99fbcb2.pdf (4 pages).
The ActiveCampus System, alleged in adverse proceedings to have been made available to the public no later than Oct. 30, 2005 by the University of California San Diego.
The AGIS LifeRing Project and its prototypes, alleged in adverse proceedings to have been made available to the public by Oct. 30, 2005 by AGIS.
The Automatic Packet/Position Reporting System, alleged in adverse proceedings to have been made available to the public no later than Sep. 21, 2004 by Bob Bruninga.
The AT&T Find Friends System, alleged in adverse proceedings to have been made available to the public no later than Jun. 24, 2002 by AT&T.
The BuddySpace system, alleged in adverse proceedings to have been made available to the public at least by Jun. 2002 and no later than Sep. 21, 2004 by the Open University.
The Navizon System, alleged in adverse proceedings to have been made available to the public at least by Oct. 30, 2005 and no later than Feb. 20, 2006 by Navizon Inc.
The Force XXI Battle Command, Brigade and Below System, alleged in adverse proceedings to have been made available to the public no later than Mar. 21, 2003 by the U.S. Army.
Defendant's Disclosure Pursuant to Patent Local Rule 4-2 of Preliminary Claim Constructions and Extrinsic Evidence, filed in *AGIS Software Development LLC* v. *Huawei Device USA Inc. et al.* (E.D. Texas), May 18, 2018 (27 pages).
P.R. 4-3—Joint Claim Construction and Prehearing Statement, filed in *AGIS Software Development LLC* v. *Huawei Device USA, Inc.* on Jun. 15, 2018 (9 pages).
Appendix 1 to P.R. 4-3—Joint Claim Construction and Prehearing Statement—Parties' Proposed Constructions and Supporting Evidence, filed in *AGIS Software Development LLC* v. *Huawei Device USA, Inc.* on Jun. 15, 2018 (131 pages).
Patent Owner's Preliminary Response, filed in IPR 2018-00817 (*Apple Inc.* v. *AGIS Software Development LLC*; U.S. Pat. No. 9,445,251), Jul. 5, 2018 (53 pages).
Patent Owner's Preliminary Response, filed in IPR 2018-00818 (*Apple Inc.* v. *AGIS Software Development LLC*; U.S. Pat. No. 9,408,055), Jul. 5, 2018 (38 pages).
Patent Owner's Preliminary Response, filed in IPR 2018-00821 (*Apple Inc.* v. *AGIS Software Development LLC*; U.S. Pat. No. 8,213,970), Jul. 24, 2018 (50 pages).
P.R. 4-3—Updated Joint Claim Construction and Prehearing Statement, filed in *AGIS Software Development LLC* v. *Huawei Device USA, Inc.* on Jul. 23, 2018 (9 pages).
Appendix 1 to P.R. 4-3—Updated Joint Claim Construction and Prehearing Statement—Parties' Proposed Constructions and Supporting Evidence, filed in *AGIS Software Development LLC* v. *Huawei Device USA, Inc.* on Jul. 23, 2018 (125 pages).

(56) References Cited

OTHER PUBLICATIONS

Decision Denying Institution of Inter Partes Review, IPR2018-00817 (*Apple Inc. v. AGIS Software Development LLC*; U.S. Patent No. 9,445,251), Oct. 3, 2018 (34 pages).
Petitioner's Reply to Patent Owner's Preliminary Response, IPR2018-00817 (*Apple Inc. v. AGIS Software Development LLC*; U.S. Patent No. 9,445,251), Aug. 10, 2018 (7 pages).
Decision Denying Institution of Inter Partes Review, IPR2018-00818 (*Apple Inc. v. AGIS Software Development LLC*; U.S. Patent No. 9,408,055), Oct. 3, 2018 (33 pages).
Petitioner's Reply to Patent Owner's Preliminary Response, IPR2018-00818 (*Apple Inc. v. AGIS Software Development LLC*; U.S. Patent No. 9,408,055), Aug. 10, 2018 (7 pages).
Patent Owner's Preliminary Response, IPR2018-00819 (*Apple Inc. v. AGIS Software Development LLC*; U.S. Patent No. 9,467,838), Aug. 9, 2018 (51 pages).
Petitioner's Reply to Patent Owner's Preliminary Response, IPR2018-00819 (*Apple Inc. v. AGIS Software Development LLC*; U.S. Patent No. 9,467,838), Aug. 10, 2018 (7 pages).
Petitioner's Reply to Patent Owner's Preliminary Response, IPR2018-00821 (*Apple Inc. v. AGIS Software Development LLC*; U.S. Patent No. 8,213,970), Aug. 10, 2018 (7 pages).
Patent Owner's Preliminary Response, IPR2018-01079 (*Google LLC v. AGIS Software Development LLC*; U.S. Patent No. 8,213,970), Aug. 23, 2018 (59 pages).
Petitioner's Reply to Patent Owner Preliminary Response, IPR2018-01079 (*Google LLC v. AGIS Software Development LLC*; U.S. Patent No. 8,213,970), Sep. 19, 2018 (8 pages).
Patent Owner's Preliminary Response, IPR2018-01080 (*Google LLC v. AGIS Software Development LLC*; U.S. Patent No. 9,408,055), Sep. 6, 2018 (41 pages).
Petitioner's Reply to Patent Owner Preliminary Response, IPR2018-01080 (*Google LLC v. AGIS Software Development LLC*; U.S. Patent No. 9,408,055), Oct. 17, 2018 (9 pages).
Patent Owner's Preliminary Response, IPR2018-01081 (*Google LLC v. AGIS Software Development LLC*; U.S. Patent No. 9,445,251), Sep. 13, 2018 (43 pages).
Petitioner's Reply to Patent Owner Preliminary Response, IPR2018-01081 (*Google LLC v. AGIS Software Development LLC*; U.S. Patent No. 9,445,251), Sep. 19, 2018 (9 pages).
Patent Owner's Preliminary Response, IPR2018-01082 (*Google LLC v. AGIS Software Development LLC*; U.S. Patent No. 9,445,251), Aug. 23, 2018 (38 pages).
Petitioner's Reply to Patent Owner Preliminary Response, IPR2018-01082 (*Google LLC v. AGIS Software Development LLC*; U.S. Patent No. 9,445,251), Sep. 19, 2018 (9 pages).
Patent Owner's Preliminary Response, IPR2018-01083 (*Google LLC v. AGIS Software Development LLC*; U.S. Patent No. 9,445,251), Oct. 11, 2018 (42 pages).
Motorola Solutions, Dispatch Console Accessories, 2018 (3 pages).
Patent Owner's Preliminary Response, IPR2018-01084 (*Google LLC v. AGIS Software Development LLC*; U.S. Patent No. 9,445,251), Oct. 11, 2018 (32 pages).
Patent Owner's Preliminary Response, IPR2018-01085 (*Google LLC v. AGIS Software Development LLC*; U.S. Patent No. 9,467,838), Aug. 23, 2018 (49 pages).
Petitioner's Reply to Patent Owner Preliminary Response, IPR2018-01084 (*Google LLC v. AGIS Software Development LLC*; U.S. Patent No. 9,467,838), Sep. 19, 2018 (9 pages).
Patent Owner's Preliminary Response, IPR2018-01086 (*Google LLC v. AGIS Software Development LLC*; U.S. Patent No. 9,467,838), Sep. 6, 2018 (53 pages).
Petitioner's Reply to Patent Owner Preliminary Response, IPR2018-01086 (*Google LLC v. AGIS Software Development LLC*; U.S. Patent No. 9,467,838), Oct. 17, 2018 (9 pages).
Patent Owner's Preliminary Response, IPR2018-01087 (*Google LLC v. AGIS Software Development LLC*; U.S. Patent No. 9,467,838), Oct. 11, 2018 (39 pages).
Patent Owner'Preliminary Response, IPR2018-01088 (*Google LLC v. AGIS Software Development LLC*; U.S. Patent No. 9,467,838), Sept. 12, 2018 (43 pages).
Petitioner's Reply to Patent Owner Preliminary Response, IPR2018-01088 (*Google LLC v. AGIS Software Development LLC*; U.S. Patent No. 9,467,838), Oct. 17, 2018 (9 pages).
Defendants' Disclosure Pursuant to Patent Local Rule 4-1 of Proposed Terms and Claim Elements for Construction, filed in *AGIS Software Development LLC v. Huawei Device USA Inc. et al. (E.D. Texas)*, Apr. 27, 2018 (16 pages).
Petition for Inter Partes Review of U.S. Patent No. 9,749,829, IPR-01471, filed on behalf of Apple, Inc., Jul. 31, 2018 (85 pages).
Apple's First Amended Answer to Plaintiff's First Amended Complaint For Patent Infringement, filed in *AGIS Software Development LLC v. Huawei Device USA Inc. et al. (E.D. Texas)*, Document 148 in Case 2:17-cv-513, Jun. 15, 2018 (23 pages).
Plaintiff AGIS Software Development LLC's Opening Claim Construction Brief, filed in *AGIS Software Development LLC v. Huawei Device USA Inc. et al. (E.D. Texas)*, Document 165 in Case 2:17-cv-513, Jul. 26, 2018 (41 pages).
Defendants' Responsive Claim Construction Brief, filed in *AGIS Software Development LLC v. Huawei Device USA Inc. et al. (E.D. Texas)*, Document 175 in Case 2:17-cv-513, Aug. 14, 2018 (56 pages).
Plaintiff AGIS Software Development LLC's Reply Claim Construction Brief, filed in *AGIS Software Development LLC v. Huawei Device USA Inc. et al. (E.D. Texas)*, Document 186 in Case 2:17-cv-513, Aug. 20, 2018 (29 pages).
Joint Claim Construction Chart Pursuant to P.R. 4-5(D), filed in *AGIS Software Development LLC v. Huawei Device USA Inc. et al. (E.D. Texas)*, Document 194 in Case 2:17-cv-513, Aug. 27, 2018 (4 pages).
Declaration of Dr. Jaime G. Carbonell in Support of Plaintiff's Opening Claim Construction Brief; Exhibit H to Plaintiff AGIS Software Development LLC's Opening Claim Construction Brief, filed in *AGIS Software Development LLC v. Huawei Device USA Inc. et al. (E.D. Texas)*, Document 165-10 in Case 2:17-cv-513, Jul. 26, 2018 (43 pages).
Declaration of Dr. Benjamin Bederson in Support of Petition for Inter Partes Review of U.S. Patent No. 8,213,970; Exhibit I to Plaintiff AGIS Software Development LLC's Opening Claim Construction Brief, filed in *AGIS Software Development LLC v. Huawei Device USA Inc. et al. (E.D. Texas)*, Case 2:17-cv-513, Jul. 26, 2018 (148 pages).
Declaration of David Hilliard Williams in Support of Petition for Inter Partes Review of U.S. Patent No. 8,213,970; Exhibit J to Plaintiff AGIS Software Development LLC's Opening Claim Construction Brief, filed in *AGIS Software Development LLC v. Huawei Device USA Inc. et al. (E.D. Texas)*, Case 2:17-cv-513, Jul. 26, 2018 (124 pages).
Declaration of Kerri-Ann Limbeed in Support of Defendants' Responsive Claim Construction Brief; Attachment #1 to Defendants' Responsive Claim Construction Brief, filed in *AGIS Software Development LLC v. Huawei Device USA Inc. et al. (E.D. Texas)*, Document 175-1 in Case 2:17-cv-513, Aug. 14, 2018 (4 pages).
Oxford American Dictionary of Current English, 1999 (p. 213); Exhibit 3 to Defendants' Responsive Claim Construction Brief, filed in *AGIS Software Development LLC v. Huawei Device USA Inc. et al. (ED. Texas)*, Document 175-4 in Case 2:17-cv-513, Aug. 14, 2018 (5 pages).
Webster's New World Dictionary of Computer Terms, Eighth Edition, 2000 (p. 157); Exhibit 4 to Defendants' Responsive Claim Construction Brief, filed in *AGIS Software Development LLC v. Huawei Device USA Inc. et al. (E.D. Texas)*, Document 175-5 in Case 2:17-cv-513, Aug. 14, 2018 (5 pages).
Microsoft Computer Dictionary, Fifth Edition, 2002 (p. 502); Exhibit 12 to Defendants' Responsive Claim Construction Brief, filed in *AGIS Software Development LLC v. Huawei Device USA Inc. et al. (E.D. Texas)*, Document 175-13 in Case 2:17-cv-513, Aug. 14, 2018 (4 pages).
3G TS 23.040 V1.0.0 (May 1999) Technical Specification (p. 6); Exhibit 20 to Defendants' Responsive Claim Construction Brief,

(56) References Cited

OTHER PUBLICATIONS filed in *AGIS Software Development LLC* v. *Huawei Device USA Inc. et al. (E.D. Texas)*, Document 175-21 in Case 2:17-cv-513, Aug. 14, 2018 (4 pages)
Microsoft Computer Dictionary, Fifth Edition, 2002 (p. 479); Exhibit 21 to Defendants' Responsive Claim Construction Brief, filed in *AGIS Software Development LLC* v. *Huawei Device USA Inc. et al. (E.D. Texas)*, Document 175-22 in Case 2:17-cv-513, Aug. 14, 2018 (5 pages).
Declaration of Chris G. Bartone, Ph.D., P.E. in Support of Defendants Huawei Device USA Inc. et al.'s Responsive Claim Construction Brief; Attachment #23 to Defendants' Responsive Claim Construction Brief, filed in *AGIS Software Development LLC* v. *Huawei Device USA Inc. et al. (E.D. Texas)*, Document 175-23 in Case 2:17-cv-513, Aug. 14, 2018 (105 pages).
Appendix A: Comparison of Method and "Device" Claims; Attachment #24 to Defendants' Responsive Claim Construction Brief, filed in *AGIS Software Development LLC* v. *Huawei Device USA Inc. et al. (E.D. Texas)*, Document 175-24 in Case 2:17-cv-513, Aug. 14, 2018 (7 pages).
Appendix B: Comparison of '838 Patent Disclosures and Similar Disclosures in '728 Patent; Attachment #25 to Defendants' Responsive Claim Construction Brief, filed in *AGIS Software Development LLC* v. *Huawei Device USA Inc. et al. (E.D. Texas)*, Document 175-25 in Case 2:17-cv-513, Aug. 14, 2018 (3 pages).
HTC Corporation et al.'s Prior Art Listed in Their Invalidity Contentions, *AGIS Software Development LLC* v. *HTC Corporation et al. (E.D. Texas)*, Case 2:17-cv-514, Aug. 30, 2018 (7 pages).
Prior Art Listed in LG Electronics' Invalidity Contentions, *AGIS Software Development LLC* v. *LG Electronics, Inc. et al. (E.D. Texas)*, Case 2:17-cv-514, Aug. 30, 2018 (9 pages).
Index of Exhibits to Apple's Invalidity Contentions, *AGIS Software Development LLC* v. *LG Electronics, Inc. et al. (E.D. Texas)*, Case 2:17-cv-516, Dec. 1, 2017 (11 pages).
Appendix A: Joint Claim Construction Chart; Attachment #1 to Joint Claim Construction Chart Pursuant to P.R. 4-5(D), filed in *AGIS Software Development LLC* v. *Huawei Device USA Inc. et al. (E.D. Texas)*, Document 194 in Case 2:17-cv-513, Aug. 27, 2018 (118 pages).
Declaration of Dr. Benjamin B. Bederson in Support of Petition for Inter Partes Review of U.S. Patent No. 9,445,251, Exhibit 1002 in IPR2018-00817 (*Apple Inc.* v. *AGIS Software Development LLC*; U.S. Patent No. 9,445,251), Mar. 22, 2018 (153 pages).
Exhibit 1010 ("Computer-generated document comparison showing differences in U.S. Appl. No. 11/711,490 and U.S. Appl. No. 11/308,648") in IPR2018-00817, Mar. 22, 2018 (94 pages).
Exhibit 1011 ("Computer-generated document comparison showing differences in U.S. Appl. No. 11/308,648 and U.S. Appl. No. 11/615,472") in IPR2018-00817, Mar. 22, 2018 (122 pages).
Exhibit 1012 ("Computer-generated document comparison showing differences in U.S. Appl. No. 11/615,472 and U.S. Appl. No. 12/761,533") in IPR2018-00817, Mar. 22, 2018 (94 pages).
Exhibit 1017 ("Computer-generated document comparison showing differences in U.S. Appl. No. 14/027,410 and U.S. Appl. No. 11/308,648") in IPR2018-00817, Mar. 22, 2018 (117 pages).
GeoTIFF Format Specification, GeoTIFF Revision 1.0, Specification Version 1.8.1, Oct. 31, 1995 (102 pages); Exhibit 1018 in IPR2018-00817.
Hornbaek, K. et al. Navigation Patterns and Usability of Zoomable User Interfaces with and without an Overview. ACM Transactions on Computer-Human Interaction, v. 9, n. 4, Dec. 2002 (pp. 362-369); Exhibit 1019 in IPR2018-00817.
MapInfo. Spatially Enhancing Business Data with Geocoding Solutions: A MapInfo White Paper, 1997 (15 pages); Exhibit 1020 in IPR2018-00817.
MapInfo Professional User's Guide Version 7.0, 2002 (752 pages); Exhibit 1021 in IPR2018-00817.
Python Documentation Release 2.0 Homepage, Oct. 16, 2000 (1 page); Exhibit 1022 in IPR2018-00817.
Python Library Reference, Section 7.2 Socket (4 pages); Exhibit 1023 in IPR2018-00817.
Mockapetris, P. Network Working Group of Internet Engineering Task Force, Request for Comments 1034, Domain Names—Concepts and Facilities, Nov. 1987 (55 pages); Exhibit 1024 in IPR2018-00817.
Claim Construction Order, issued in *Automated Packaging Systems, Inc.* v. *Free Flow Packaging International, Inc. (N.D. Cal.)*, Document 217 in Case 3:18-cv-356, Aug. 2, 2018 (44 pages); Exhibit 1025 in IPR2018-00817.
Declaration of Dr. Benjamin B. Bederson in Support of Petition for Inter Partes Review of U.S. Patent No. 9,408,055, Exhibit 1002 in IPR2018-00818 (*Apple Inc.* v. *AGIS Software Development LLC*; U.S. Patent No. 9,408,055), Mar. 22, 2018 (115 pages).
Declaration of Dr. Benjamin B. Bederson in Support of Petition for Inter Partes Review of U.S. Patent No. 9,467,838, Exhibit 1002 in IPR2018-00819 (*Apple Inc.* v. *AGIS Software Development LLC*; U.S. Patent No. 9,467,838), Mar. 22, 2018 (186 pages).
Apple Computer, Inc. Macintosh Human Interface Guidelines, 1992 (410 pages); Exhibit 1009 in IPR2018-00821 (*Apple Inc.* v. *AGIS Software Development LLC*; U.S. Patent No. 8,213,970).
Bederson, Benjamin B. Fisheye Menus. Proceedings of the ACM Symposium on User Interface Software and Technology, 2000 (pp. 217-225); Exhibit 1015 in IPR2018-00821.
Norman, Donald A. The Psychology of Everyday Things, Chapter 1, The Psychopathology of Everyday Things, 1999 (pp. 1-33); Exhibit 1016 in IPR2018-00821.
Nielsen, J. Usability Engineering, 1993 (pp. 129-148); Exhibit 1017 in IPR2018-00821.
Shneiderman, B. Designing the User Interface: Strategies for Effective Human-Computer Interaction, Third Edition, 1998 (252 pages); Exhibit 1018 in IPR2018-00821.
Ball, D. et al. How to Do Everything with Your Treo 600, 2004 (pp. 25-30); Exhibit 1019 in IPR2018-00821.
Exhibit 1020 in IPR2018-00821 ("Redline comparison between the specifications of U.S. Appl. No. 11/612,830 and U.S. Patent No. 8,213,970"), Mar. 22, 2018 (90 pages).
Declaration of Dr. Benjamin B. Bederson in Support of Petition for Inter Partes Review of U.S. Patent No. 9,749,829, Exhibit 1002 in IPR2018-01471 (*Apple Inc.* v. *AGIS Software Development LLC*; U.S. Patent No. 9,749,829), Jul. 31, 2018 (114 pages).
Declaration of David Hilliard Williams in Support of Petition for Inter Partes Review of U.S. Patent No. 9,408,055; Exhibit 1003 in IPR2018-01080 (*Google LLC* v. *AGIS Software Development LLC*; U.S. Patent No. 9,408,055), May 15, 2018 (138 pages).
Declaration of David Hilliard Williams in Support of Petition for Inter Partes Review of US. Patent No. 9,445,251; Exhibit 1003 in IPR2018-01081 (*Google LLC* v. *AGIS Software Development LLC*; U.S. Patent No. 9,445,251), May 15, 2018 (93 pages).
Exhibit 1009 in IPR2018-01081 ("Microsoft Word document compare of specifications between U.S. Patent No. 7,630,724 to Beyer, Jr. et al. and U.S. Patent No. 7,031,728 to Beyer, Jr. et al."), May 15, 2018 (33 pages)10.
Declaration of David Hilliard Williams in Support of Petition for Inter Partes Review of U.S. Patent No. 9,445,251; Exhibit 1003 in IPR2018-01082 (*Google LLC* v. *AGIS Software Development LLC*; U.S. Patent No. 9,445,251), May 15, 2018 (102 pages).
Declaration of David Hilliard Williams in Support of Petition for Inter Partes Review of U.S. Patent No. 9,445,251; Exhibit 1003 in IPR2018-01083 (*Google LLC* v. *AGIS Software Development LLC*; U.S. Patent No. 9,445,251), May 15, 2018 (105 pages).
Declaration of David Hilliard Williams in Support of Petition for Inter Partes Review of U.S. Patent No. 9,445,251; Exhibit 1003 in IPR2018-01084 (*Google LLC* v. *AGIS Software Development LLC*; U.S. Patent No. 9,445,251), May 15, 2018 (116 pages).
Declaration of David Hilliard Williams in Support of Petition for Inter Partes Review of U.S. Patent No. 9,467,838; Exhibit 1003 in IPR2018-01085 (*Google LLC* v. *AGIS Software Development LLC*; U.S. Patent No. 9,467,838), May 15, 2018 (102 pages).
Declaration of David Hilliard Williams in Support of Petition for Inter Partes Review of U.S. Patent No. 9,467,838; Exhibit 1003 in IPR2018-01086 (*Google LLC* v. *AGIS Software Development LLC*; U.S. Patent No. 9,467,838), May 15, 2018 (111 pages).

(56) References Cited

OTHER PUBLICATIONS

Declaration of David Hilliard Williams in Support of Petition for Inter Partes Review of U.S. Patent No. 9,467,838; Exhibit 1003 in IPR2018-01087 (*Google LLC v. AGIS Software Development LLC*; U.S. Patent No. 9,467,838), May 15, 2018 (106 pages).
Declaration of David Hilliard Williams in Support of Petition for Inter Partes Review of U.S. Patent No. 9,467,838; Exhibit 1003 in IPR2018-01088 (*Google LLC v. AGIS Software Development LLC*; U.S. Patent No. 9,467,838), May 15,2018 (125 pages).
Plaintiff's First Amended Complaint for Patent Infringement, filed in *AGIS Software Development LLC v. Apple, Inc. (E.D. Texas)*, Document 32 in Case 2:17-cv-516, Sep. 18, 2017; also Exhibit 1013 in IPR2018-00817 (33 pages).
Exhibit C for U.S. Patent No. 9,445,251 Against Apple Accused Products; Attachment to Plaintiff's Preliminary Infringement Contentions in *AGIS Software Development LLC v. Apple, Inc. (E.D. Texas)*, Case 2:17-cv-516; also Exhibit 1014 in IPR2018-00817, Mar. 22, 2018 (120 pages).
Plaintiff's Original Complaint for Patent Infringement, filed in *AGIS Software Development LLC v. HTC Corp. (E.D. Texas)*, Document 1 in Case 2:17-cv-514, Jun. 21, 2017; also Exhibit 1015 in IPR2018-00817 (24 pages).
Plaintiff's Disclosure of Asserted Claims and Infringement Contentions, *AGIS Software Development LLC v. Apple, Inc. (E.D. Texas)*, Case 2:17-cv-516, Sep. 18, 2017; also Exhibit 1016 in IPR2018-00817 (12 pages).
Exhibit D—Claim Chart for U.S. Patent No. 9,467,838 Against Apple Accused Products; Attachment to Plaintiff's Preliminary Infringement Contentions in *AGIS Software Development LLC v. Apple, Inc. (E.D. Texas)*, Case 2:17-cv-516; also Exhibit 1014 in IPR2018-00819, Mar. 22, 2018 (381 pages).
Exhibit A for U.S. Patent No. 8,213,970 Against Apple Accused Products; Attachment to Plaintiff's Preliminary Infringement Contentions in *AGIS Software Development LLC v. Apple, Inc. (E.D. Texas)*, Case 2:17-cv-516, also Exhibit 1008 in IPR2018-00821, Mar. 22, 2018 (39 pages).
Exhibit B for U.S. Patent No. 9,408,055 Against HUAWEI Accused Products; Attachment to Plaintiff's Infringement Contentions in *AGIS Software Development LLC v. Huawei Device USA Inc., et al. (E.D. Texas)*, Case 2:17-cv-513; also Exhibit 1010 in IPR2018-01080, May 15, 2018 (889 pages).
Claim Construction Memorandum and Order, issued in *AGIS Software Development LLC v. Huawei Device USA Inc., et al. (E.D. Texas)*, Document 205 in Case 2:17-cv-513, October 10, 2018; also Exhibit 1041 in IPR2018-01080 (60 pages).
Plaintiff's Original Complaint for Patent Infringement, filed in *AGIS Software Development LLC v. Huawei Device USA Inc., et al. (E.D. Texas)*, Document 2 in Case 2:17-cv-513, Jun. 21, 2017; also Exhibit 1008 in IPR2018-01081 (24 pages).
Plaintiff's First Amended Complaint for Patent Infringement, filed in *AGIS Software Development LLC v. Huawei Device USA Inc. et al. (E.D. Texas)*, Document 32 in Case 2:17-cv-513, Aug. 17, 2017 (26 pages).
Defendants Huawei Device USA Inc. et al.'s Answer to Plaintiff's First Amended Complaint For Patent Infringement, filed in *AGIS Software Development LLC v. Huawei Device USA Inc. et al. (E.D. Texas)*, Document 29 in Case 2:17-cv-513, Oct. 5, 2017 (20 pages).
Plaintiff's Original Complaint for Patent Infringement, filed in *AGIS Software Development LLC v. LG Electronics, Inc. (E.D. Texas)*, Document 1 in Case 2:17-cv-515, Jun. 21, 2017 (24 pages).
Plaintiff's Original Complaint for Patent Infringement, filed in *AGIS Software Development LLC v. Apple, Inc. (E.D. Texas)*, Document 1 in Case 2:17-cv-516, Jun. 21, 2017 (26 pages).
Plaintiff's Original Complaint for Patent Infringement, filed in *AGIS Software Development LLC v. ZTE Corp. et al. (E.D. Texas)*, Document 1 in Case 2:17-cv-517, Jun. 21, 2017 (25 pages).
Apple's Answer to AGIS's Original Complaint For Patent Infringement, filed in *AGIS Software Development LLC v. Apple Inc. (E.D. Texas)*, Document 20 in Case 2:17-cv-516, Aug. 28, 2017 (14 pages).
Apple's Answer to Plaintiff's First Amended Complaint For Patent Infringement, filed in *AGIS Software Development LLC v. Apple Inc. (E.D. Texas)*, Document 36 in Case 2:17-cv-516, Oct. 2, 2017 (16 pages).
Plaintiff's First Amended Complaint for Patent Infringement, filed in *AGIS Software Development LLC v. ZTE Corp. et al. (E.D. Texas)*, Document 32 in Case 2:17-cv-517, Oct. 17, 2017 (33 pages).
HTC Corporation's Answer, Defenses, and Counterclaims to AGIS Software Development, LLC's Complaint for Patent Infringement, filed in *AGIS Software Development LLC v. HTC Corp. Inc. (E.D. Texas)*, Document 82 in Case 2:17-cv-514, Oct. 12, 2018 (19 pages).
Defendant LG Electronics Inc.'s Answer to Plaintiff's Complaint for Patent Infringement, filed in *AGIS Software Development LLC v. LG Electronics, Inc. (E.D. Texas)*, Document 83 in Case 2:17-cv-514, Oct. 12, 2018 (22 pages).
Decision: Institution of Inter Partes Review, IPR2018-01079 (*Google LLC v. AGIS Software Development LLC*; U.S. Patent No. 8,213,970), Nov. 20, 2018 (38 pages).
Decision Denying Institution of Inter Partes Review, IPR2018-01081 (*Google LLC v. AGIS Software Development LLC*; U.S. Patent No. 9,445,251), Nov. 20, 2018 (38 pages).
Decision Denying Institution of Inter Partes Review, IPR2018-01082 (*Google LLC v. AGIS Software Development LLC*; U.S. Patent No. 9,445,251), Nov. 20, 2018 (39 pages).
Decision Denying Institution of Inter Partes Review, IPR2018-01085 (*Google LLC v. AGIS Software Development LLC*; U.S. Patent No. 9,467,838), Nov. 19, 2018 (22 pages).
Patent Owner's Preliminary Response, IPR2018-01471 (*Apple Inc. v. AGIS Software Development LLC*; U.S. Patent No. 9,749,829), Nov. 28, 2018 (24 pages).
ZTE (USA) Inc., and ZTE (TX), Inc.'s Second Election of PriorArt References, *AGIS Software Development LLC v. ZTE Corp. et al. (E.D. Texas)*, 2:17-cv-514, Aug. 29, 2018 (7 pages).
HTC Corporation's Preliminary Election of PriorArt References, *AGIS Software Development LLC v. Huawei Device USA Inc. et al. (E.D. Texas)*, 2:17-cv-514, Apr. 30, 2018 (6 pages).
Defendants Huawei Device USA Inc. et al.'s Preliminary Election of PriorArt References, *AGIS Software Development LLC v. Huawei Device USA Inc. et al. (E.D. Texas)*, 2:17-cv-513, Apr. 30, 2018 (7 pages).
Apple Inc.'s Final Election of Prior Art References, *AGIS Software Development LLC v. Apple Inc. (E.D. Texas)*, 2:17-cv-513, Aug. 29, 2018 (15 pages).
Claim Construction Hearing Before the Honorable Chief Judge Rodney Gilstrap (United States District Judge), *AGIS Software Development LLC v. Huawei Device USA Inc. et al. (E.D. Texas)*, 2:17-cv-513, Sep. 13, 2018 (109 pages).
Plaintiff's Disclosure of Asserted Claims and Infringement Contentions, *AGIS Software Development LLC v. Huawei Device USA Inc. et al. (E.D. Texas)*, 2:17-cv-513, Nov. 28, 2017 (18 pages).
Exhibit A for U.S. Patent No. 8,213,970 Against Huawei Accused Products; Attachment to Plaintiff's Disclosure of Asserted Claims and Infringement Contentions in *AGIS Software Development LLC v. Huawei Device USA Inc. et al. (E.D. Texas)*, Case 2:17-cv-513, Nov. 28, 2017 (36 pages).
Exhibit C for U.S. Patent No. 9,445,251 Against Huawei Accused Products; Attachment to Plaintiff's Disclosure of Asserted Claims and Infringement Contentions in *AGIS Software Development LLC v. Huawei Device USA Inc. et al. (E.D. Texas)*, Case 2:17-cv-513, Nov. 28, 2017 (314 pages).
Exhibit D—Claim Chart for U.S. Patent No. 9,467,838 Against Huawei; Attachment to Plaintiff's Disclosure of Asserted Claims and Infringement Contentions in *AGIS Software Development LLC v. Huawei Device USA Inc. et al. (E.D. Texas)*, Case 2:17-cv-513, Nov. 28, 2017 (312 pages).
Plaintiff's Disclosure of Asserted Claims and Infringement Contentions, *AGIS Software Development LLC v. LG Electronics, Inc. (E.D. Texas)*, 2:17-cv-515, Nov. 28, 2017 (16 pages).
Exhibit A for U.S. Patent No. 8,213,970 Against LG Accused Products; Attachment to Plaintiff's Disclosure of Asserted Claims and Infringement Contentions in *AGIS Software Development LLC v. LG Electronics, Inc. (E.D. Texas)*, 2:17-cv-515, Nov. 28, 2017 (36 pages).

(56) References Cited

OTHER PUBLICATIONS

Exhibit B for U.S. Patent No. 9,408,055 Against LG Accused Products; Attachment to Plaintiff's Disclosure of Asserted Claims and Infringement Contentions in *AGIS Software Development LLC v. LG Electronics, Inc. (E.D. Texas)*, 2:17-cv-515, Nov. 28, 2017 (902 pages).
Exhibit C for U.S. Patent No. 9,445,251 Against LG Accused Products; Attachment to Plaintiff's Disclosure of Asserted Claims and Infringement Contentions in *AGIS Software Development LLC v. LG Electronics, Inc. (E.D. Texas)*, 2:17-cv-515, Nov. 28, 2017 (335 pages).
Exhibit D—Claim Chart for U.S. Patent No. 9,467,838 Against LG; Attachment to Plaintiff's Disclosure of Asserted Claims and Infringement Contentions in *AGIS Software Development LLC v. LG Electronics, Inc. (E.D. Texas)*, 2:17-cv-515, Nov. 28, 2017 (329 pages).
Plaintiff's Disclosure of Asserted Claims and Infringement Contentions, *AGIS Software Development LLC v. HTC Corp. (E.D. Texas)*, 2:17-cv-514, Jan. 19, 2018 (23 pages).
Exhibit A for U.S. Patent No. 8,213,970 Against HTC Accused Products; Attachment to Plaintiff's Disclosure of Asserted Claims and Infringement Contentions in *AGIS Software Development LLC v. HTC Corp. (E.D. Texas)*, 2:17-cv-514, Jan. 19, 2018 (42 pages).
Exhibit B for U.S. Patent No. 9,408,055 Against HTC Accused Products; Attachment to Plaintiff's Disclosure of Asserted Claims and Infringement Contentions in *AGIS Software Development LLC v. HTC Corg. (E.D. Texas)*, 2:17-cv-514, Jan. 19, 2018 (979 pages).
Exhibit C for U.S. Patent No. 9,445,251 Against HTC Accused Products; Attachment to Plaintiff's Disclosure of Asserted Claims and Infringement Contentions in *AGIS Software Development LLC v. HTC Corp. (E.D. Texas)*, 2:17-cv-514, Jan. 19, 2018 (313 pages).
Exhibit D—Claim Chart for U.S. Patent No. 9,467,838 Against HTC; Attachment to Plaintiff's Disclosure of Asserted Claims and Infringement Contentions in *AGIS Software Development LLC v. HTC Corp. (E.D. Texas)*, 2:17-cv-514, Jan. 19, 2018 (329 pages).
Plaintiff's Disclosure of Asserted Claims and Infringement Contentions, *AGIS Software Development LLC v. ZTE Corp et al. (E.D. Texas)*, 2:17-cv-517, Jan. 19, 2018 (20 pages).
Exhibit A for U.S. Patent No. 8,213,970 Against ZTE Accused Products; Attachment to Plaintiff's Disclosure of Asserted Claims and Infringement Contentions in *AGIS Software Development LLC v. ZTE Corp et al. (E.D. Texas)*, 2:17-cv-517, Jan. 19, 2018 (41 pages).
Exhibit B for U.S. Patent No. 9,408,055 Against ZTE Accused Products; Attachment to Plaintiff's Disclosure of Asserted Claims and Infringement Contentions in *AGIS Software Development LLC v. ZTE Corp et al. (E.D. Texas)*, 2:17-cv-517, Jan. 19, 2018 (1001 pages).
Exhibit C for U.S. Patent No. 9,445,251 Against ZTE Accused Products; Attachment to Plaintiff's Disclosure of Asserted Claims and Infringement Contentions in *AGIS Software Development LLC v. ZTE Corp et al. (E.D. Texas)*, 2:17-cv-517, Jan. 19, 2018 (314 pages).
Exhibit D—Claim Chart for U.S. Patent No. 9,467,838 Against ZTE; Attachment to Plaintiff's Disclosure of Asserted Claims and Infringement Contentions in *AGIS Software Development LLC v. ZTE Corp et al. (E.D. Texas)*, 2:17-cv-517, Jan. 19, 2018 (329 pages).
Plaintiff's Disclosure of Asserted Claims and Infringement Contentions, *AGIS Software Development LLC v. ZTE Corp et al. (E.D. Texas)*, 2:17-cv-517, Aug. 28, 2018 (21 pages).
Defendant Apple's Amended Patent Rule 3-3 Invalidity Contentions, *AGIS Software Development LLC v. Huawei Device USA Inc. et al. (E.D. Texas)*, 2:17-cv-513, Apr. 16, 2018 (49 pages).
Decision: Institution of Inter Partes Review, IPR2018-00819 (*Apple Inc. v. AGIS Software Development LLC*; U.S. Patent No. 9,467,838), Nov. 7, 2018 (38 pages).
Decision Denying Institution of Inter Partes Review, IPR2018-00821 (*Apple Inc. v. AGIS Software Development LLC*; U.S. Patent No. 8,213,970), Oct. 23, 2018 (35 pages).
Petitioner's Reply to Patent Owner Preliminary Response, IPR2018-01083 (*Google LLC v. AGIS Software Development LLC*; U.S. Patent No. 9,445,251), Nov. 1, 2018 (9 pages).
Petitioner's Reply to Patent Owner Preliminary Response, IPR2018-01085 (*Google LLC v. AGIS Software Development LLC*; U.S. Patent No. 9,467,838), Sep. 19, 2018 (9 pages).
Corrected Petition for Inter Partes Review of U.S. Patent No. 9,467,838, IPR2018-01087 (*Google LLC v. AGIS Software Development LLC*; U.S. Patent No. 9,467,838), Oct. 31, 2018 (76 pages).
Exhibit 1031 in IPR2018-01087 (*Google LLC v. AGIS Software Development LLC*; U.S. Patent No. 9,467,838), Transcript of teleconference between Board and Parties, Oct. 26, 2018 (22 pages).
Exhibit 1032 in IPR2018-01087 (*Google LLC v. AGIS Software Development LLC*; U.S. Patent No. 9,467,838), Document showing differences between Petition and Corrected Petition in redline, Oct. 31, 2018 (77 pages).
Petitioner's Motion Under 37 C.F.R. § 42.104(C) to Correct Clerical Errors in the Petition, IPR2018-01087 (*Google LLC v. AGIS Software Development LLC*; U.S. Patent No. 9,467,838), Oct. 31, 2018 (7 pages).
Petitioner's Reply to Patent Owner Preliminary Response, IPR2018-01087 (*Google LLC v. AGIS Software Development LLC*; U.S. Patent No. 9,467,838), Nov. 1, 2018 (6 pages).
Patent Owner's Supplemental Preliminary Response to Corrected Petition for Inter Partes Review, IPR2018-01087 (*Google LLC v. AGIS Software Development LLC*; U.S. Patent No. 9,467,838), Nov. 7, 2018 (6 pages).
Corrected Petition for Inter Partes Review of U.S. Patent No. 9,467,838, IPR2018-01088 (*Google LLC v. AGIS Software Development LLC*; U.S. Patent No. 9,467,838), Oct. 31, 2018 (83 pages).
Exhibit 1032 in IPR2018-01088 (*Google LLC v. AGIS Software Development LLC*; U.S. Patent No. 9,467,838), Document showing differences between Petition and Corrected Petition in redline, Oct. 31, 2018 (84 pages).
(C91) Petitioner's Motion Under 37 C.F.R. § 42.104(C) to Correct Clerical Errors in the Petition, IPR2018-01088 (*Google LLC v. AGIS Software Development LLC*; U.S. Patent No. 9,467,838), Oct. 31, 2018 (7 pages).
Patent Owner's Supplemental Preliminary Response to Corrected Petition for Inter Partes Review, IPR2018-01088 (*Google LLC v. AGIS Software Development LLC*; U.S. Patent No. 9,467,838), Nov. 7, 2018 (6 pages).
Joint Motion to Stay All Deadlines and Notice of Settlement Regarding Huawei Defendants, filed in *AGIS Software Development LLC v. Huawei Device USA Inc. et al. (E.D. Texas)*, Document 221 in Case 2:17-cv-513, Nov. 5, 2018 (6 pages).
Plaintiff/ Counterclaim-Defendant AGIS Software Development LLC Answer to Declaratory Judgment Counterclaims of Defendant / Counterclaim-Plaintiff HTC Corporation, filed in *AGIS Software Development LLC v. HTC Corp. et al. (E.D. Texas)*, Document 86 in Case 2:17-cv-514, Nov. 2, 2018 (8 pages).
Decision Instituting Inter Partes Review, IPR2018-01080 (*Google LLC v. AGIS Software Development LLC*; U.S. Patent No. 9,408,055), Dec. 4, 2018 (38 pages).
Decision Denying Institution of Inter Partes Review, IPR2018-01086 (*Google LLC v. AGIS Software Development LLC*; U.S. Patent No. 9,467,838), Dec. 4, 2018 (23 pages).
Decision Denying Institution of Inter Partes Review, IPR2018-01088 (*Google LLC v. AGIS Software Development LLC*; U.S. Patent No. 9,467,838), Dec. 10, 2018 (30 pages).
Exhibit 3001 in IPR2018-01471 (*Apple Inc. v. AGIS Software Development LLC*; U.S. Patent No. 9,749,829), PTAB Conference Call, Dec. 18, 2018 (26 pages).
Joint Statement of Stipulation Regarding Claim Construction, filed in *AGIS Software Development LLC v. HTC Corp. et al. (E.D. Texas)*, Document 91 in Case 2:17-cv-514, Dec. 8, 2018 (5 pages).
Claim Construction Order, filed in *AGIS Software Development LLC v. HTC Corp. et al. (E.D. Texas)*, Document 93 in Case 2:17-cv-514, Dec. 18, 2018 (2 pages).
Petition for Inter Partes Review (U.S. Patent and Trademark Office Patent Trial and Appeal Board), Case No. IPR2019-00389, filed Dec. 7, 2018, U.S. Patent No. 9,467,838.

(56) References Cited

OTHER PUBLICATIONS

Petition for Inter Partes Review (U.S. Patent and Trademark Office Patent Trial and Appeal Board), Case No. IPR2019-00403, filed Dec. 7, 2018, U.S. Patent No. 9,467,838.
Petition for Inter Partes Review (U.S. Patent and Trademark Office Patent Trial and Appeal Board), Case No. IPR2019-00411, filed Dec. 7, 2018, U.S. Patent No. 8,213,970.
Petition for Inter Partes Review (U.S. Patent and Trademark Office Patent Trial and Appeal Board), Case No. IPR2019-00432, filed Dec. 13, 2018, U.S. Patent No. 9,408,055.
Petition for Inter Partes Review (U.S. Patent and Trademark Office Patent Trial and Appeal Board), Case No. IPR2019-00485, filed Dec. 20, 2018, U.S. Patent No. 8,213,970.
Petition for Inter Partes Review (U.S. Patent and Trademark Office Patent Trial and Appeal Board), Case No. IPR2019-00487, filed Jan. 4, 2019, U.S. Patent No. 9,408,055.
Petition for Inter Partes Review (U.S. Patent and Trademark Office Patent Trial and Appeal Board), Case No. IPR2019-00523, filed Jan. 3, 2019, U.S. Patent No. 9,445,251.
Petition for Inter Partes Review (U.S. Patent and Trademark Office Patent Trial and Appeal Board), Case No. IPR2019-00524, filed Jan. 3, 2019, U.S. Patent No. 9,445,251.

\* cited by examiner

METHOD TO PROVIDE AD HOC AND PASSWORD PROTECTED DIGITAL AND VOICE NETWORKS

CROSS REFERENCE TO RELATED APPLICATIONS

This application is a continuation of U.S. patent application Ser. No. 15/287,638, filed on Oct. 6, 2016, which is a continuation of U.S. patent application Ser. No. 14/529,978, filed on Oct, 31, 2014, now U.S. Pat. No. 9,467,838 issued Oct. 11, 2016, which is a continuation-in-part of U.S. patent application Ser. No. 14/027,410, filed on Sep. 16, 2013, now U.S. Pat. No. 8,880,042 issued Nov. 4, 2014 which is a continuation of U.S. patent application Ser. No. 13/751,453, filed Jan. 28, 2013, now U.S. Pat. No. 8,538,393 issued Sep. 17, 2013, which is a continuation-in-part of U.S. patent application Ser. No. 12/761,533 filed on Apr. 16, 2010, now U.S. Pat. No. 8,364,129 issued Jan. 29, 2013, which is a continuation-in-part of U.S. patent application Ser.No. 11/615,472 filed on Dec. 22, 2006, now U.S. Pat. No. 8,126,441 issued on Feb. 28, 2012, which is a continuation-in-part of U.S. patent application Ser. No. 11/308,648 filed Apr. 17, 2006, now U.S. Pat. No. 7,630,724 issued on Dec. 8, 2009, which is a continuation-in-part of U.S. patent application Ser. No. 10/711,490, filed on Sep. 21, 2004, now U.S. Pat. No. 7,031,728 issued on Apr. 18, 2006. All of the preceding applications are incorporated herein by reference in their entirety.

BACKGROUND OF THE INVENTION

Field of the Invention

A communications method and system using a plurality of cellular phones each having an integrated Personal Digital Assistant (PDA) and Global Positioning System (GPS) receiver for the management of two or more people through the use of a communications network. The method and system provide each user with an integrated handheld cellular/PDA/GPS/phone that has Advanced Communication Software application programs (hereinafter referred to as ACS) and databases used in conjunction with a remote Server that enable a user to quickly establish a communication network of cell phone participants having a common temporary ad hoc network using mobile wireless communication devices.

The invention includes a method and communication systemto quickly set up and provide ad hoc, password protected, digital and voice networks to allow a group of people to be able to set up a network easily and rapidly, especially in an emergency situation.

Description of Related Art

The purpose of a communications system is to transmit digital messages from a source, located at one point, to user destination(s), located at other point(s) some distance away. A communications system is generally comprised of three basic elements: transmitter, information channel and receiver. One form of communication in recent years is cellular phone telephony. A network of cellular communication systems set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include GPS navigation that utilizes satellite navigation. These devices thus unite cellular phone technology with navigation information, computer information transmission and receipt of data.

The method and operation of communication devices used herein are described in U.S. Pat. No. 7,031,728 which is hereby incorporated by reference and U.S. Pat. No. 7,630,724.

Military, first responder, and other public and private emergency groups need to be able to set up ad hoc digital and voice networks easily and rapidly. These private networks may be temporary or longer lasting in nature. The users need to be able to rapidly coordinate their activities eliminating the need for pre-entry of data into a web and or identifying others by name, phone numbers or email addresses so that all intended participants that enter the agreed ad hoc network name and password are both digitally and voice interconnected. When a user or users leave the network, no data concerning the network participants need be retained.

Coordinating different organizations at the scene of a disaster presents several problems as there are voice and digital data (text messages) communications that need to be constantly occurring up and down the chain of command. As an example, communications are required from a police chief to a police captain to a police lieutenant to a police sergeant to a policeman and then back up the same chain of command. Digital data exchange of GPS data or other means provides the location component of the units. Digital chat, text messages, white boards and photo video exchange provide extensive collaboration. However, during a disaster, other first responders such as fire departments must become engaged. While the fire department users may have voice and digital data (text messages) communications up and down their chain of command, these individuals do not have the ability to cross communicate necessarily with police units without a substantial degree of immediate coordination. The method and system in accordance with the present invention described herein discloses how digital communications along with Personal Computer (PC) and PDA devices can be used to quickly establish user specific password protected private ad hoc voice and data networks to enable both data and voice communications up and down their chain of command and simultaneously with different, not pre-known, organizations responding to a disaster. The invention defines a method of accomplishing this by providing all personnel that need to communicate with each other with a PC or PDA which are interconnected to a Server using cellular or other communications.

SUMMARY OF THE INVENTION

Applicant's communication system and method described herein is embodied in the Advanced Communication Software (ACS) application programs developed by applicant and installed in the integrated PDA/GPS cell phones used herein and remote Servers.

A plurality of Internet Protocol (IP) capable PDA/GPS devices each having ACS application programs and databases provides a communication network in conjunction with a remote Server that provides the ability to: a) establish an ad hoc network of devices so that the devices can either broadcast to a group or selectively transmit to each of the other; each PDA/GPS phone starts by requesting access to the Server and identifying a mutually agreed to network name and password and once granted, reports its GPS position and status; the Server then routes the data to all signed on network participants so that each of the devices exchange location, status and other information; (b) force the received information to the recipient's display and enable the recipient to acquire additional information by touching the display screen at a remote phone's location on the PDA display; (c) make calls to or send data to remote phones by touching their display symbols and selecting the appropriate soft switch; (d) layer a sufficient number of soft switches or buttons on the PDA display to perform the above functions without overlaying the map; and (e) allow a polling mode in each cell phone that permits a user to contact other cell phone users that have a common interest or relationship with a password and identifier for communication and to establish quickly a temporary ad hoc network especially in an emergency.

A communication Server acts as a forwarder for IP communications between any combination of cell phone/PDA users and/or PC based users. Network participant location, identity and status messages are sent to the Server by each user. Network participant entered tracks are also sent to the Server. Because this network participant location and track data is of interest to all the network participants, the Server forwards the data received from one participant to all other participants, causing their displays automatically, without any operator action, to display the received information, thus providing the information necessary for all network participants to know the identity, location and status of all other network participants.

The Server also acts as a forwarder of data addressed from one participant to one or more addressed participants, thus permitting the transmission of free text, preformatted messages, photographs, video, Email and Uniform Resource Locator (URL) data from one network participant to other selected network participants.

The above functions can also be accomplished using peer to peer WiFi, WiMax or other peer to peer communications. However, for use with cellular communications and to assure the level of security that cell phone companies require, a centralized static IP routable Server is used.

The IP Server also fills another role of being a database from which data can be requested by network participants (i.e. maps, satellite images, and the like) or can be pushed to network participants (i.e. symbology and soft switch changes, and the like). The Server is used to establish an ad hoc network within certain groups using an ad hoc event name and password.

This invention provides a method and a system establishing an ad hoc password protected digital and voice network that can be temporarily set up or longer lasting in nature. The invention described herein allows users to rapidly coordinate their activities without having to pre-enter data into a web or identify others by name, E mail addresses or phone numbers. Essentially the users that establish the ad hoc and password protected digital and voice networks are required to enter the Server's IP address and an ad hoc event name and a password. In the case of military and first responders, the name of the user's unit may also be used. This action causes the specific PDA or PC of the user to commence reporting directly to the Server's IP address. Once the Server receives the initial IP message from the user's PDA or PC, the server can commence to exchange data with the user's PDA or PC. The initial IP message may also contain additional data such as a license number and, if desired, a phone number manually entered or automatically acquired by the ACS. The IP address of the PDA and PC unit sending the initial IP message is stored by the Server. The Server then responds with a message notifying the user that his PC/PDA is connected to the Server. The user PDA/PC then reports its GPS location and other status information directly to the Server. This information is retained by the Server even when there are no other devices initially communicating with the Server. When the other user's devices sign on to the Server with the same ad hoc event name and password, the Server software then recognizes all the users and stores their IP addresses in the Server. Thus the Server has all the users IP addresses stored and can pass location and status information among the ad hoc network participants even though the network participants have not entered other network participants' names, phone numbers or email addresses. Thus one of the purposes of the invention is to allow an ad hoc network to be formed on a temporary basis in a rapid manner.

When using the PTT feature, the ACS can enable the network participant to: 1. PTT with all that are in the ad hoc digital network, or 2. PTT with select specific network participants, by touching their symbol(s) and then selecting PTT soft switch or 3. Specify a group of the network participants by assigning their symbols or unit names to a list of network participants and then associating the list with a soft switch whose function is to enable the operator to have PTT communications with all in the list.

Since only one person is transmitting on a PTT voice network at any given time, the receiving network participant's ACS can relate the PTT IP address to the IP address of the unit transmitting his identification on the digital ad hoc network. This information can then be used by the other PTT networked participant's ACS to: 1. flash the transmitting unit's name on their PDA/PC screens or 2. if a photograph has been attached to the ad hoc digital network symbol of the PTT transmitting person, to flash that photograph on the receiving unit's PDA/PC display.

It is an object of this invention to enable each participant in the communication network to join other ad hoc network participants to form an ad hoc digital and voice network with other cell phone users rapidly for coordinating member activities.

In accordance with these and other objects which will become apparent hereinafter, the instant invention will now be described with particular reference to the accompanying drawings.

PREFERRED EMBODIMENT OF THE INVENTION

A method and communication system that joins a communications network of participants using :handheld cell phones having integrated PDA and GPS circuitry with ACS application programs that allow a participant having an ACS equipped cell phone to provide an ad hoc and password protected digital and voice network.

A communication Server acts as a forwarder for IP communications between any combination of cell phone/PDA users and/or PC based user, Network participant location, identity and status messages are sent to the Server by each user. Network participant entered tracks are also sent to the Server. Because this data is of interest to all the network participants, the Server forwards the data received from one participant to all other participants, thus providing the information necessary for all network participants to know the identity, location and status of all other network participants.

The Server allows the set up of the ad hoc network with an ad hoc event name and a password.

The Server also acts as a forwarder of data addressed from one participant to one or more addressed participants, thus permitting the transmission of free text, preformatted messages, photographs, video, email and URL data from one network participant to other selected network participants.

Figure 1:
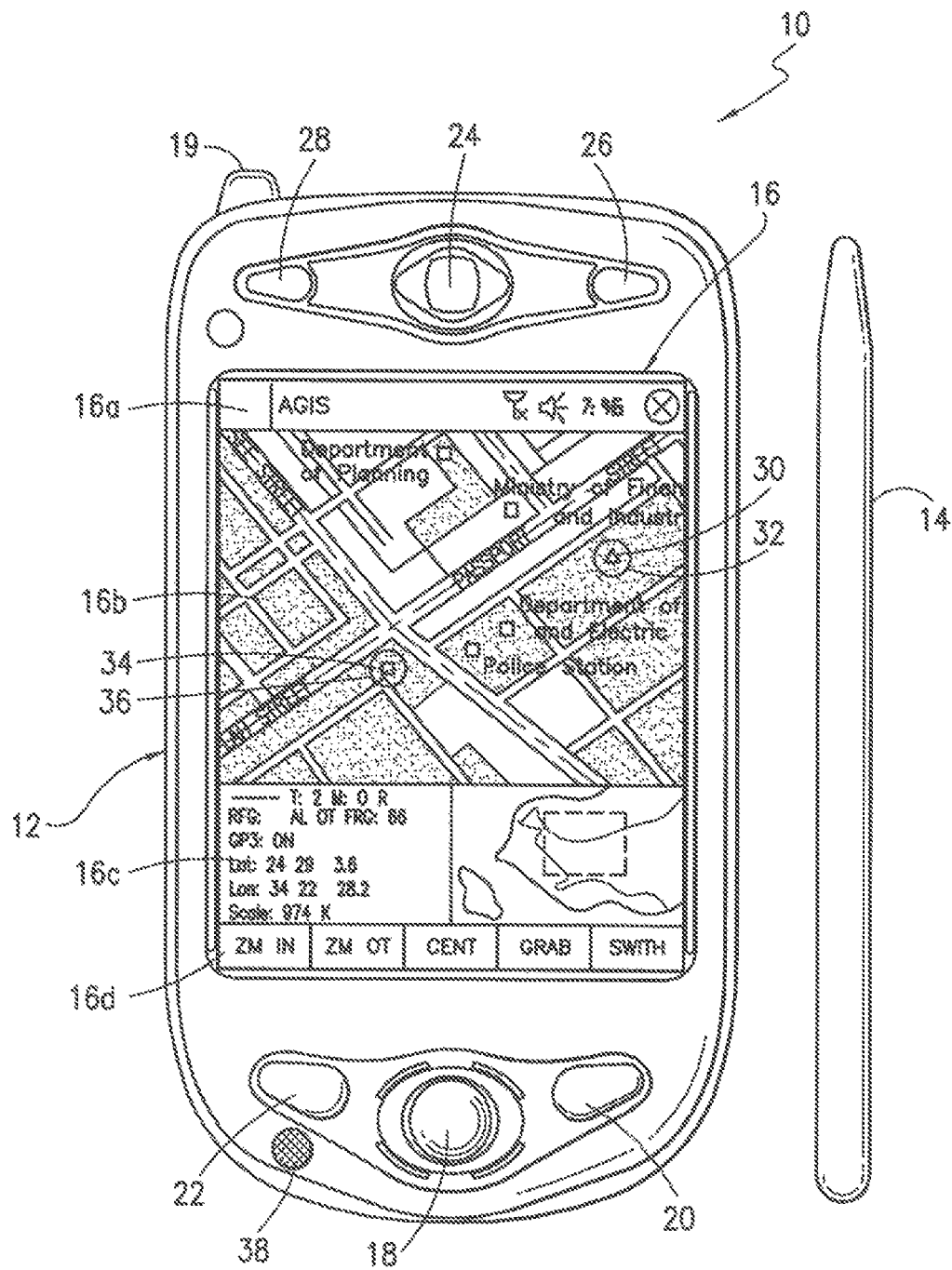
FIG. 1 shows a front plan view of a cellular phone/PDA/GPS having a touch screen.

Referring now to the drawings and, in particular, to FIG. 1, a small handheld cellular phone 10 is shown that includes a PDA and a GPS communications device integrated in housing 12 that includes an on/off power switch 19, a microphone 38, and a Liquid Crystal Display (LCD) display 16 that is also a touch screen system. The small area 16a is the navigation bar that depicts the telephone, GPS and other status data and the active software. Each cell phone includes a Central Processing Unit (CPU) and databases that store information useful in the communication network. The CPU also includes a symbol generator for creating touch screen display symbols discussed herein. With the touch screen 16, the screen symbols are entered through GPS inputs or by the operator using a stylus 14 (or operator finger) by manipulatively directing the stylus 14 to literally touch display 16. The soft switches 16d displayed on the display 16 are likewise activated by using a stylus 14 and physically and manipulatively directing the stylus to literally touch display 16. The display x, y coordinates of the touched point are known by a CPU in the PDA section of the communication system in housing 12 that can coordinate various information contained in the PDA relative to the x, y coordinate position on the display 16. Inside housing 12 is contained the conventional cellular phone elements including a modem, a CPU for use with a PDA and associated circuitry connected to speaker 24 and microphone 38. A GPS navigational receiver that receives signals from satellites that can determine the latitude and longitude of the cellular phone housing 12 can be internal or external to the housing 12. Conventional PDA/cellular phones are currently on sale and sold as a unit (or with an external connected GPS) that can be used for cellular telephone calls and sending cellular Short Message Service (SMS) and Transmission Control Protocol (TCP) TCP/IP or other messages using the FDA's display 16 and computer CPU. The GPS system including a receiver in housing 12 is capable of determining the latitude and longitude and through SMS, TCP/IP, WiFi or other digital messaging software, to also transmit this latitude and longitude information of housing 12 to other cellular phones in the communication network via cellular communications, WiFi or radio. The device 10 includes a pair of cellular phone hardware activating buttons 20 to turn the cellular phone on and 22 to turn the cellular phone off. Navigation pad actuator 18 is similar to a joy or force stick in that the actuator 18 manually provides movement commands that can be used by the PDA's software to move a cursor on display 16. Switches 26 and 28 are designed to quickly select an operator specified network software program. Speaker 24 and microphone 38 are used for audio messages. Switch 19 at the top left of device 10 is the power on and power off switch for the entire device.

The heart of the invention lies in the applicant's ACS application programs provided in the device. The ACS programs are activated by clicking on an icon on the display to turn the ACS programs on or off. Mounted within housing 12 as part of the PDA is the display 16 and the CPU. The internal CPU includes databases and software application programs that provide for a geographical map and georeferenced entities that are shown as display portion 16b that includes as part of the display various areas of interest in the particular local map section.

When looking at display 16, the software switches (soft switches) which appear at the very bottom of the display 16d are used to control by touch many of the software driven functions of the cellular phone and PDA. The soft switches are activated through the operator's use of the navigation pad 18, or a small track ball, force stick or similar hardware display cursor pointing device. Alternatively, the operator may choose to activate the software switches by touching the screen with a stylus 14 (or finger) at the switches' 16d locations. When some of the software switches are activated, different software switches appear. The bar display 16d shows the software switches "ZM IN (zoom in)," "ZM OT (zoom out)," "CENT (center)" and "GRAB (pan/grab)" at the bottom of the screen. These software switches enable the operator to perform these functions. The "SWITH (switch)" software switch at the lower right causes a matrix of layered software switches (soft switches) to appear above the bottom row of switches. Through use of the software switches, the operator can also manipulate the geographical map 16b or chart display. When looking at FIG. 1, display symbols depicting permanent geographical locations and buildings are shown. For example, the police station is shown and, when the symbol is touched by the stylus or finger, the latitude and longitude of the symbol's location, as shown in display section 16c, is displayed at the bottom left of the screen. The bottom right side of display 16c is a multifunction inset area that can contain a variety of information including: a) a list of the communication link participants; b) a list of received messages; c) a map, aerial photograph or satellite image with an indication of the zoom and offset location of the main map display, which is indicated by a square that depicts the area actually displayed in the main geographical screen 16b; d) applicable status information; and e) a list of the communication net participants. Each participant user would have a device 10 shown in FIG. 1.

Also shown on the display screen 16, specifically the geographical display 16b, is a pair of different looking symbols 30 and 34, a small triangle and a small square, which are not labeled. These symbols 30 and 34 can represent communication net participants having cellular phones in the displayed geographical area that are part of the overall cellular phone communications net, each participant having the same device 10 used. The latitude and longitude of symbol 30 is associated within a database with a specific cell phone number and, if available, its IP address and email address. The screen display 16*b*, which is a touch screen, provides x and y coordinates of the screen 16*b* to the CPU's software from a map in a geographical database. The software has an algorithm that relates the x and y coordinates to latitude and longitude and can access a communications net participant's symbol or a fixed or movable entity's symbol as being the one closest to that point.

In order to initiate a telephone call to the cellular phone user (communication net participant) represented by symbol (triangle) 30 at a specific latitude and longitude display on chart 16*b*, the operator touches the triangle 30 symbol with the stylus 14. The user then touches a "call" software switch from a matrix of displayed soft switches that would overlay the display area 16*c*. Immediately, the cellular phone will initiate a cellular telephone call to the cellular phone user at the geographical location shown that represents symbol 30. A second cellular phone user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done, the telephone call is initiated. Other types of symbolic elements on the display 16 can indicate that a cellular phone call is in effect. Additionally, the operator can touch both symbol 34 and symbol 30 and can activate a conference call between the two cellular phones and users represented by symbols 30 and 34. Again, a symbolic ring around symbol 34 indicates that a call has been initiated.

Equally important, a user can call the police station, or any other specific geographical facility displayed on the map including: buildings, locations of people, vehicles, facilities, restaurants, or the like, whose cellular phone numbers and, if available, Email addresses, IP addresses and their URLs (previously stored in the database) by touching a specific facility location on the map display using the stylus 14 and then touching the cellular phone call switch. As an example, the operator can touch and point to call a restaurant using a soft switch by touching the restaurant location with a stylus and then touching the call soft switch. The cellular phone will then call the restaurant. Thus, using the present invention, each participant can touch and point to call to one or more other net participants symbolically displayed on the map, each of whom has a device as shown in FIG. 1, and can also point to call facilities that had been previously stored in the phone's database. Furthermore, this symbol hooking and soft switch technique can be used to go to a fixed facility's website or to automatically enter the fixed facility's email address in an email.

Each cellular phone/PDA/GPS user device is identified on the map display of the other network participant user's phone devices by a display symbol that is generated on each user phone display to indicate each user's own location and identity. Each symbol is placed at the correct geographical location on the user display and is correlated with the map on the display and is transmitted and automatically displayed on the other network participant's PC and PDA devices. The operator of each cellular phone/PDA/GPS device may also enter one or more other fixed entities (buildings, facilities, restaurants, police stations, etc.) and geo-referenced events such as fires, accidents, etc., into its database. This information can be likewise transmitted to all the other participants on the communications net and automatically displayed. The map, fixed entities, events and cellular phone/PDA/GPS device communication net participants' latitude and longitude information is related to the "x" and "y" location on the touch screen display map by a mathematical correlation algorithm.

When the cellular phone/PDA/GPS device user uses a stylus or finger to touch one or more of the symbols or a location displayed on the cellular phone map display, the system's software causes the status and latitude and longitude information concerning that symbol or location to be displayed. In order to hook a symbol or "track" such as another net participant which represents an entity on the geo-referenced map display, or a fixed geographical entity such as a restaurant, police station or a new entity observed by a cell phone user which is discussed below, the operator touches at or near the location of a geo-referenced symbol appearing on the cellular phone/PDA display that represents a specific track or specific participant or other entity. The hook application software determines that the stylus (or finger) is pointed close to or at the location of the symbol and puts a circle, square or other indication around the symbol indicating that amplification information concerning the symbol is to be displayed. The operator can hook entered tracks or his own track symbol and add data or change data associated with the indicated symbol. The hook application code then sends a message to the database application code to store the facility or entity's updated data. The display application code retrieves the primary data and amplification data concerning the symbol or entity from the database and displays the information at the correct screen location. The operator can then read the amplification data that relates to that specific symbol at the specific location. The cell phone operator can also select soft switches on the touch screen display to change the primary data and amplification data. Furthermore, the operator can use a similar method of hooking and selecting to activate particular soft switches to take other actions which could include: making cellular phone calls, conference calls, 800 number calls; sending a free text message, operator selected preformatted messages, photographs or videos to the hooked symbol; or to drop an entered symbol.

Each known net participant has a cellular phone number, IP address and, if available, Email address that is stored in each participant's device database.

To use the communication system, a user starts the PDA/cellular phone device system by turning on the cell phone power and selecting the cell phone and network software which causes: a) the cellular phone to be activated (if it has not already been activated); b) the GPS interface receiver to be established; c) a map of the geographic area where the operator is located and operator's own unit symbol to appear at the correct latitude and longitude on the map on the display; d) the locations of fixed facilities such as restaurants, hotels, fire departments, police stations, and military barracks, that are part of the database to appear as symbols on the map; e) the device selected item read out area which provides amplification information for the communications net participants or the entity that has been hooked (on the display screen) to appear on the display; f) an insert area that contains various data including: the list of net participants, a list of messages to be read, an indication of what portion of the map is being displayed in major map area and other information to appear on the display; and g) a row of primary software created "soft switches" that are always present on the display to appear.

For point to call network units and fixed facilities, the application code detects the x, y display screen location of the symbol that is designated by the user's stylus and translates the x, y coordinates to latitude and longitude and then: (1) searches the database to find the symbol at that location, (2) places a "hook" indicator (a circle, square or other shape) around the symbol, (3) displays any amplifying data and (4) obtains the symbol's associated phone number (or, for Voice over IP (VoIP) an IP address) from the database. Upon receiving a "call" designation from the soft switch, the operator's device's ACS causes the appropriate phone number or IP address to be called. Upon receiving an indication that the phone number is being called, the application code places a box around the symbol (color, dashed or the like). When the call is connected, the box changes to indicate that the connection is made. When the other party hangs up, the box disappears.

As each of the cell phone participants reports its identity, location and status to the other participants' devices, the received data is automatically geo-referenced and filed in their databases that are accessible by identity and by location. This data is then displayed on each cell phone display. When a request for data is received by touching the display screen, a location search is made by the ACS and a symbol modifier (circle, square, etc.) is generated around the symbol closest to the x, y position of the stylus. When the application code receives a soft switch command to place a phone call or send data, the software uses the phone number (or IP address) associated with the unit to place the call or to send data.

If a cell phone device receives a digital message that a call is being received, the receiving cell phone's ACS application code places a box or similar object around the transmitter symbol indicating who the call is from. When the call is answered, the application software changes the visual characteristics of the box. In a similar manner, when a phone receives a digital text message, photograph or video, a box appears around the transmitter's symbol indicating the transmitter of the message. The point to call network devices are network participants and each one has a PC/PDA device with the same software for use as a total participant network. Other situations for calling facilities that are not network participants are also described below.

Thus, a user is capable of initiating a cellular phone call by touch only and initiating conference calls by touching the geo-referenced map symbols. Furthermore, by using a similar symbol touching technique, a cellular phone can send user selected messages to cause a remote cellular phone to display and optionally announce emergency and other messages and to optionally elicit a response from the remote cellular phone.

All of the network participants have the same communication cell phone/PDA/GPS device described herein. The method and system include the ability of a specific user to provide polling in which other cellular phones, using SMS, internet or WiFi, report periodically based on criteria such as time, speed, distance traveled, or a combination of time, speed and distance traveled. A user can manually poll any or all other cell phone devices that are used by all of the participants in the communication network having the same devices. The receiving cellular phone application code responds to the polling command with the receiving cellular phone's location and status which could include battery level, GPS status, signal strength and entered track data. Optionally, the phone operators can set their phones to report automatically, based on time or distance traveled intervals or another criterion.

The soft switch application software causes a visual display of a matrix such as five across by six up (or another matrix) in which switch names are placed on the cellular/PDA display. The soft switch network application software knows the touch screen location of each of the switches in the matrix and the software routines that will be activated upon touching the switch.

The bottom row of soft switches displayed on the touch screen remains visually fixed. These switches concern the functions that are the most often used. One of the switches causes a matrix of other soft switches to appear above the visually fixed soft switches. These switches are function soft switches, the activation of any one of which causes a different matrix of soft switches to appear, which are known as the action soft switches. When the action soft switches appear, the function soft switch, which caused the action soft switches to appear, itself appears as a label in the lowerleft (or some other standard location) indicating to the operator the function soft switch that has been selected. When the operator selects an action soft switch, the appropriate application software to accomplish the action is activated.

Upon receiving a soft switch activation message, the ACS accesses the appropriate task execution software which accomplishes the required tasks including: entry of track data, entry of track amplification data, transmission of alpha/numeric messages, photographs, videos, display of messages to be read, selection of map types, placing voice calls, placing conference calls and 800 conference calls, presenting different potential operator selections, control of the display actions, polling network participants, establishing nets of participants (groups) so that communications with all in the group can be accomplished with a single soft switch action, and dropping a previously entered track. By providing a matrix and layers of soft switches which are easily manipulated by a stylus, each cell phone device in the communication network is extremely efficient in accessing and coordinating the appropriate application program for the device to perform.

Users such as emergency groups, police, fire personal, military, first responders and other groups need to be able to set up ad hoc digital and voice networks easily and rapidly. The users need to be able to rapidly coordinate activities eliminating the need for pre-entry data as discussed above. Users are required to enter the Servers' IP address and an ad hoc event name, a password and, for first responders and military, the names of their units. This will normally be controlled by the PDA/PC user's position in the chain of command. For others it can be any selected name and, if desired, password.

Figure 2:
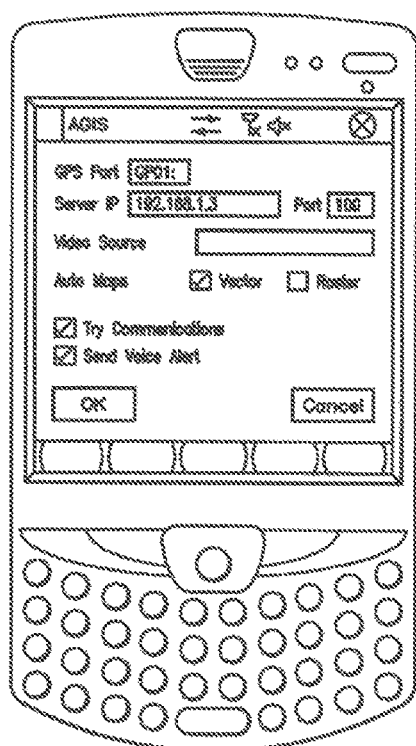
FIG. 2 shows the screen IP address entry menu.
Figure 3:
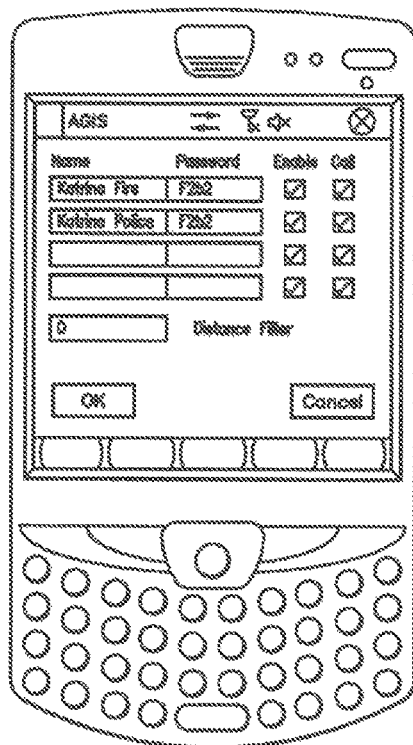
FIG. 3 shows ad hoc net names and password screen entry name.
Figure 4:
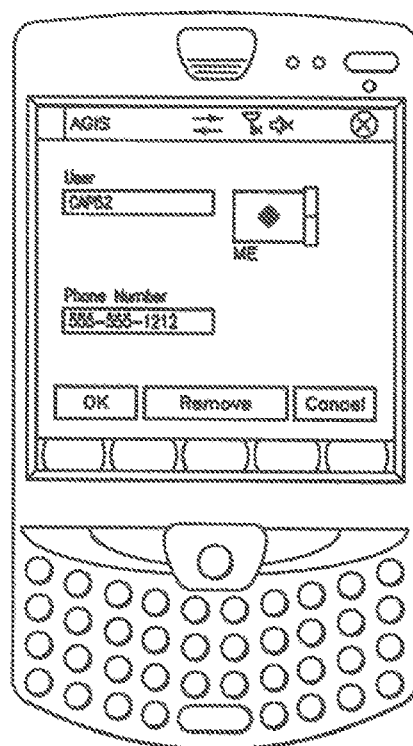
FIG. 4 shows a screen entry identifying user.

Referring now to FIG. 2, the PDA/PC screen displays an IP address entry menu. The user inserts the Server's IP address. Thus, as shown in FIG. 2, the user has entered in the cell phone/PDA the Server IP address and port number along with the GPS port listing and other information. Once that information is entered, referring now to FIG. 3, the user now enters the ad hoc event network name which is shown in this example as "Katrina" along with a password. Referring now to FIG. 4, the user then enters the user name or a unit name. FIG. 4 shows the entered user name and a phone number. The phone number may be automatically entered by the ACS or manually entered. The phone number is not required unless using the phone system (not VoIP) to make calls. These are the initial user steps required to establish an ad hoc network or to join onto an existing ad hoc network.

Figure 5:
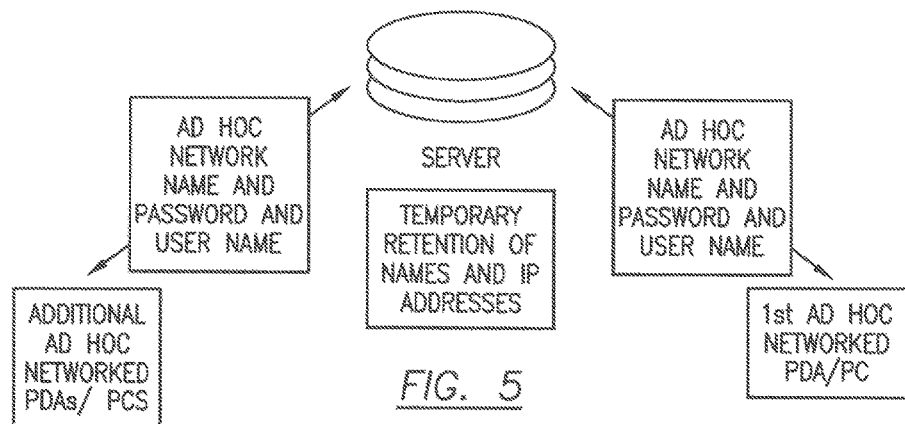
FIG. 5 shows a flow chart of the network as users sign on to the network.

Referring now to FIG. 5, these actions cause the user cell phone/PDA or PC to commence reporting to the Server. Upon receipt of the initial message from the user's PDA/PC, which may also contain additional data such as a license number, the Server stores the IP address of the user's PDA/PC unit and responds with a message notifying the user that he or she is connected to the Server. The PDA/PC then automatically commences to report its GPS derived location and other status information to the Server. Since there are no other devices initially communicating with the Server, the Server just retains the information. When other devices sign on to the Server with the same ad hoc event name and password, the Server's software recognizes this and stores their IP addresses. Since the Server has all parties' IP addresses, the server is able to pass location and status information automatically between the ad hoc network participants. This can occur even though the ad hoc network participants have not entered other network participants names, telephone numbers or Email addresses and do not have the other network participants' IP addresses, phone numbers or Email addresses. Once this connection is made, data types that are entered on one display that is of interest to all is sent from the server to all others in the network. Such data types include track location and track amplification data, geo-referenced white boards, and chat.

When the PDA/PC user wants to address particular data (a text message, photograph, video clip, voice recording, white board, or chat), the user enters the name of the other ad hoc network participant by either entering a name or touching his or her symbol. Since the Server knows the IP address of the name or symbol, the Server forwards the data appropriately to that network participant. When a unit signs off the network, it transmits a message to the Server which then transmits a message to all the network participants to drop the unit and its associated tracks. If a unit loses communications for a variable time period, the unit's data is flushed from each of the recipient network participants systems according to a variable time period. After a separate variable time period, the Server also flushes the non-reporting units data.

Figure 6:
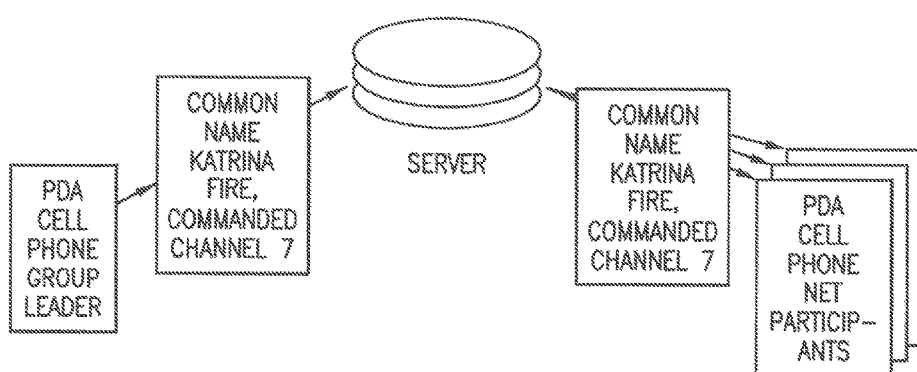
FIG. 6 shows a flow chart that depicts how a group commander can command networked PDAs/PCS and radios to load a Push To Talk (PTT) channel.

As can be seen in FIG. 6, provisions have been made for the PDA/PC to report on multiple networks thus allowing both digital communications up and down the chain of command and with adjacent units that have entered a common ad hoc network name and password.

Typically military and First Responder units use Push-to-Talk (PTT) communications. Units in an organization's chain of command typically have instituted a method to establish voice communications between themselves for they know each other's cellular phone numbers, PTT cellular group identifiers and radio frequencies or channel numbers. However, in a disaster there are many different units (fire, police, EMS, Military, and the like) involved all of whom need to establish voice communications between each other. The issue then becomes how to coordinate these PTT voice communications with the ad hoc digital communications so that all on the digital data network automatically also have PTT voice communications with each other. If the PCs and PDAs in a group have manually entered their phone numbers, or the ACS has automatically entered their phone numbers, and sent their phone numbers as part of their initial message to the Server, this data is then sent by the Server to all others in the network. Upon receiving the phone number data, the recipients' ACS loads the cell phones numbers into their databases creating a phone number PTT group common with the digital IP network group.

The issue when using radios, however, is different. PTT radio coordination between multiple people is achieved by using a common radio frequency "Channel".

Furthermore, it is desirable to enable it so that, when new network participants join the digital network, they are automatically included in the voice network and, when they leave the digital network, they are automatically dropped from the digital network.

Figure 7:
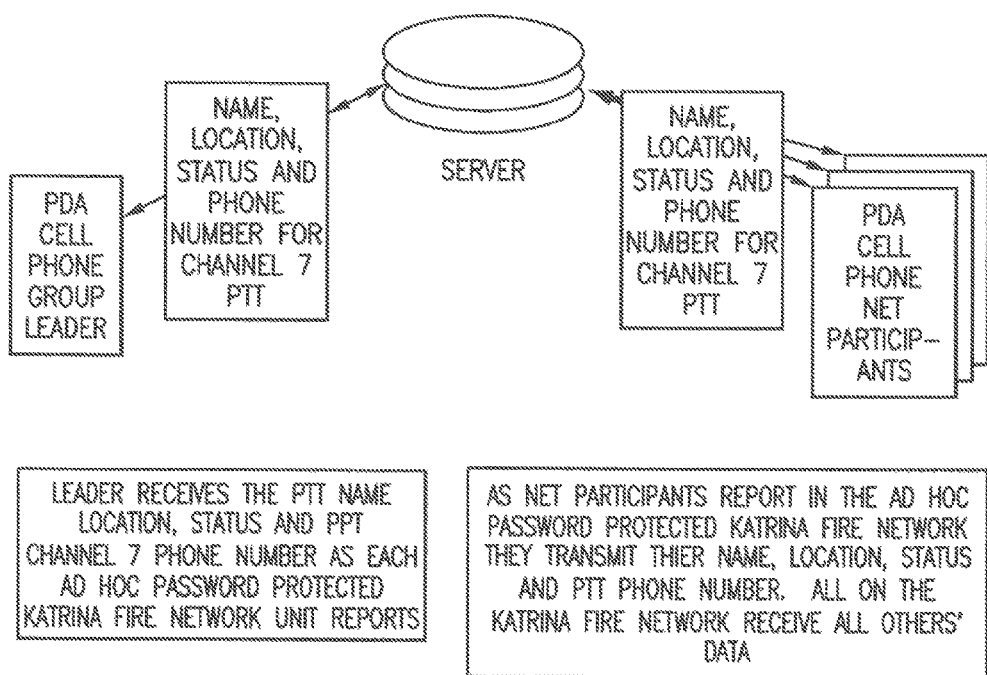
FIG. 7 shows a flow chart that depicts how networked radio units respond to receipt of the Push-to-Talk (PTT) Commanded Channel.

As can be seen in FIG. 6 and FIG. 7, a network participant currently can establish a new ad hoc digital network or join an existing ad hoc digital network by entering the ad hoc network name and password into his PDA/PC. To enable voice coordination with all that are a part of the ad hoc digital network, the user then enters (if user is authorized to do so) a Channel or Group number that the user is commanding all in the ad hoc network to establish as their PTT voice net. As seen in FIG. 6, the operator has commanded all to shift to Radio Channel or to a specific PTT cellular or radio channel; i.e. Group 7.

This action causes the PTT Channel, or PTT Group 7, to be sent to the other PDA/PC users in the ad hoc password protected network through the Server.

As shown in FIG. 6 and FIG. 7, the Group leader enters the Katrina Fire ad hoc network and issues a command which is sent to the Server to cause the PDAs/PCs that are in the Katrina Fire Group to automatically shift their Radio or cellular device to Channel 7. Each PDA cell phone can connect to the user's Radio for control with a USB cable, or WiFi, Bluetooth, or Near Field Communications (NFC) signals or other communications that are contained in the PDA/PC cellular device. This enables the Radios to shift to a common channel. This action is received by the Server which then sends the "Shift to Channel 7 Command" to all network participants in the Katrina Fire ad hoc network. When the PDA/PC/Tablet Katrina Fire network participant's software receives the command to shift its Radio Channel PPT to Group 7, this action causes the PDA's ACS to establish a new Channel 7 group (or to override an old Channel 7 group) that consists of all on the digital ad hoc network. The PC and PDAs then send their radios' digital interfaces messages to shift to Channel 7 or to the frequency associated with Channel 7. The digitally networked PC's and PDA's ACS devices then send a message to all on the digital network that they have shifted to Channel 7 (or to the appropriate frequency) and also further send the Group Leader's identifier and Command to shift to Channel 7 so that the ACS' devices associated with new users joining the digital network will automatically digitally set their radios to Channel 7 or the appropriate frequency.

As shown in FIG. 7, each time one of the network participants reports to the Katrina Fire network its Name, Position and Status, it now also reports that it is in PTT Channel 7 enabling the PTT group to grows in size until it encompasses all in the ad hoc password protected digital network. When units drop out of the Common Interest Network or lose communications because they are no longer active or they are out of range, their PTT Channel data is likewise dropped as they dropped out of the digital because their reports have not been received for a set, but adjustable, time period. If a unit rejoins the network, their PTT Name and Phone number is again automatically added to the Katrina Fire Interest Group as they are accepted by the Server into the Katrina Fire Interest digital Group.

When using the PTT feature, the ACS can enable the network participant to: 1. PTT with all that are in the ad hoc digital network, or 2. PTT with select specific network participants, by touching their symbol(s) and then selecting PTT soft switch or 3. Specify a group of the network participants by assigning their symbol or unit name to a list of network participants and then associating the list with a soft switch whose function is to enable the operator to have PTT communications with all in the list.

Since only one person is transmitting on a PTT voice network at any given time, the receiving network participant's ACS can relate the PTT IP address to the IP address of the unit transmitting his identification on the digital ad hoc network. This information can then be used by the other PTT networked participant's ACS to: 1. flash the transmitting unit's name on their PDA I PC screens or 2. if a photograph has been attached to the ad hoc digital network symbol of the PTT transmitting person, to flash that photograph on the receiving unit's PDA/PC display.

Figure 8:
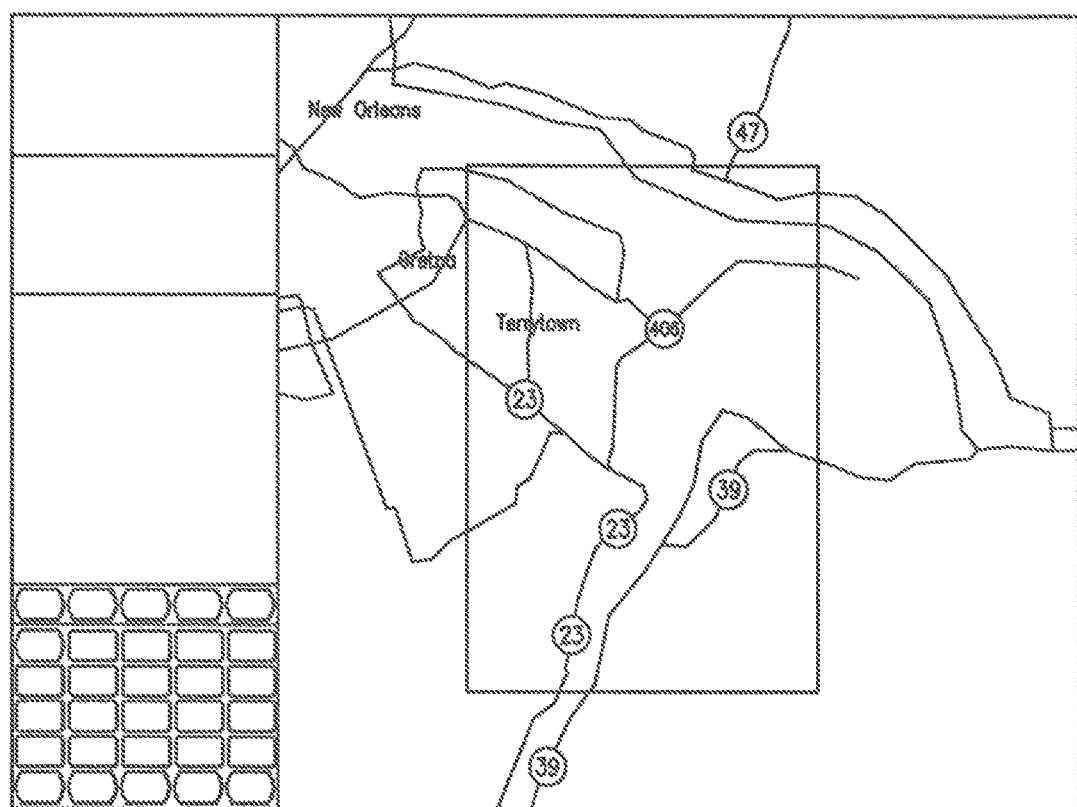
FIG. 8 shows a PDA screen geographical display that represents the area covered by the network.

Referring now to FIG. 8, for some Emergency events, and in particular military operations, it is desirable to further define ad hoc networks so that the networks encompass only a certain geographical area defined by boundary lines on a map. To accomplish this, an enhancement to the ad hoc digital and voice PTT password protected network is provided. As an example, once the Katrina Fire digital and PTT network is established, the ad hoc network can be further refined by the Group Leader defining a map area that limits the participating group to only those users within a geographically defined area by the Group Leader, creating on his PC/PDA display a box that defines a geographic area on a map.

As shown in FIG. 8, the Latitude/Longitude points that define the rectangle of the boundary area are sent from the Group Leader's device to the Server which relays the data to the other participating unit PC/FDA devices in the Katrina Fire network. When the participating unit devices receive the Latitude/Longitude points, their software computes whether their PC/PDA unit is inside or outside a boundary area. If the users are inside the defined area, the users retain but disregard the Latitude/Longitude data and continue to report on the digital password protected network and to use the commanded PTT channel/frequency. However, if the users are outside the area, the users send a "drop me message" to the Katrina Fire PDA/PC digital network Server and cease reporting on the network. When Katrina Fire network PDA/PC user units leave the defined area or lose communications for a specified, but adjustable, time period, the Server drops the unit from the network and informs all network users that the unit is dropped from the digital network and from voice PTT Channel 7 which causes all others on the network to drop them. When Katrina Fire networked PDA/PC user units re-enter the area, the unit's ACS detects the fact and commences reporting as it receives reports from other network participants it will receive the current PTT channel or frequency.

In disasters, battery life is essential as there may not be extra batteries available or a power available to recharge the battery. It is therefore essential to lessen battery utilization. The normal method by which this is accomplished is to not use software that keeps the display on, uses the GPS or transmits on the communications. However, deactivating any one of these processes produces a problem with providing location data to all on the network.

With location sharing there are essentially two times when the location information is essential: a) Where the user wants all to know his/her location and status and the location and status of others and b) When the commander wants to know the location and status of all or of a particular unit.

When the user wants others to know the user location and status, the user can simply turn on location reporting software which then turns on the display, the GPS and the communications reporting software causing the reporting of the user location to the ad hoc password protected digital network. However, when the commander or someone else wants to know the location and status of the PDA/PC unit that is conserving battery usage by having user display, GPS and communications transmission turned on, the commander has no method to accomplish this.

This problem is overcome by enabling the commander to transmit a "turn on" IP message to the battery conserving(s) unit(s) by addressing the message to the ad hoc network Server which then sends an SMS message to the addressed phone. The SMS message will be received as long as the phone is powered on, as SMS is integrated with the cell phone's voice communications. The Server could also send a turn on IP message to networked radios, which will then cause the radio's computer to send a digital message to the receiving PC/PDA to activate the user display and location and status reporting software.

Figure 9:
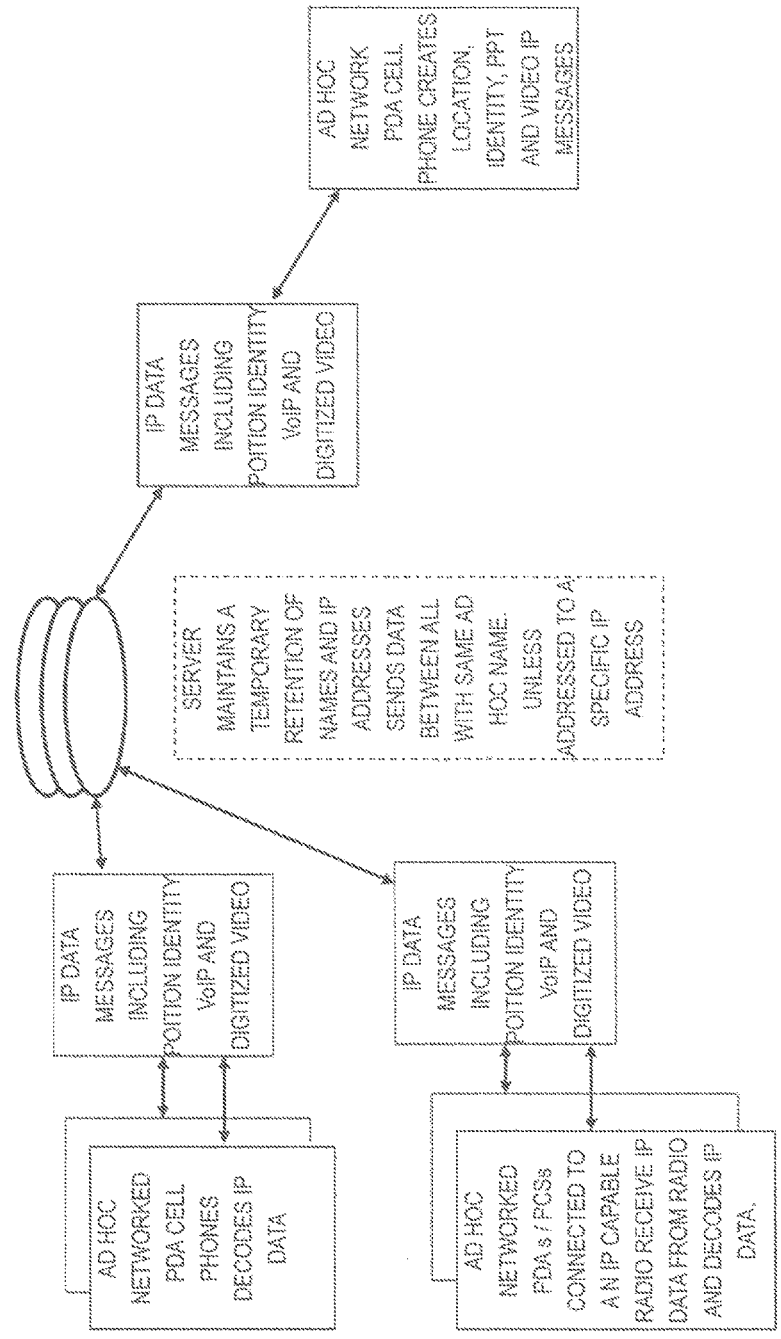
FIG. 9 shows a diagram that enables determining location, status, ViOP, PTT, and video communication between adios and cell phones.

Referring now to FIG. 9, the diagram illustrates the enabling of location, status, VoIP, PTT, and video communications between radios and cell phones. The server maintains a temporary retention of names and IP addresses and sends data between all with the same ad hoc name unless addressed to a specific IP address. This requires that there is a radio with digital capabilities attached to the server shown in FIGS. 5, 6, and 7. These radios are set so that they each have a unique IP address. All of the participants have either PDA cell phones or PDAs without cellular. Those that also have PDAs without cellular (or choose not to use cellular) are connected to their radios via a USB cable or Wi-Fi, Bluetooth, or near field communications (NFC) that is part of the PDA/PC OR PDA cell phone. This is illustrated in FIG. 9.

Figure 10:
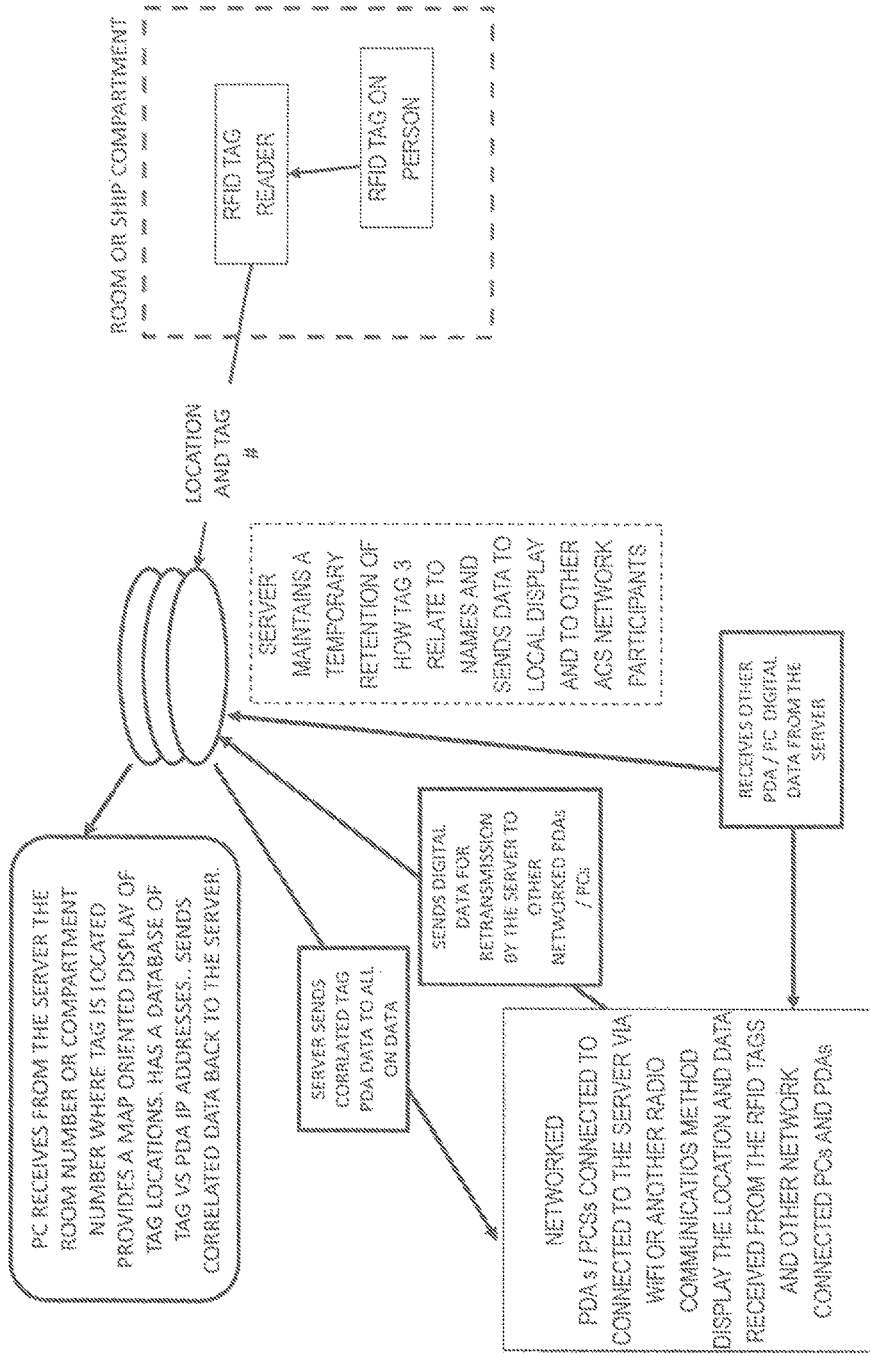
FIG. 10 shows a diagram that describes enabling non RFID equipped PDA phones to receive RFID tag data.

Referring now to FIG. 10 the diagram shows enabling non-RFID equipped PDA phones to receive MID tag data. The server maintains a temporary retention of how Tags relate to names and sends data to local display and to other ACS network participants. Currently RFID tags are used for many functions, one of which is to track personnel inside a building to the room or compartment in which they are located. This is accomplished by RFID readers that are in each of the rooms. When personnel with an RFID tag get within a particular distance or range of the RFID reader, the reader detects their presence and sends it to a central site server via a USB cable or Wi-Fi. The PC connected to the server displays the personnel room locations. With the invention described herein, the server would then send the location to the ACS PDA/PC phones that would be carried by individuals located throughout the building or ship. The PDA/PC phones would display the room or ships compartments and the location of individuals with RFID tags and simultaneously enable PTT, chat, messaging, whiteboards, commands geo-fence penetration alerts or other types of messages between each of the PDA cell phones. The RFID tag would provide room location data of all to all that are on the ACS Wi-Fi network without their PDA cell phone having an REID Reader attached to it. The operation is explained in detail in FIG. 10.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method performed by a first mobile device having a display and one or more processors, the method comprising:
executing operations on the one or more processors of the first mobile device, the operations comprising:
associating the first mobile device with a first identity, wherein the first identity corresponds to a first network participant;

receiving a request to join a communication network, wherein the request is sent by one of a plurality of second mobile devices included in the communication network;

based on acceptance of the request, joining the communication network, wherein joining the network comprises granting authorization for the second mobile devices to repeatedly perform remote control operations on the first mobile device;

determining a device location corresponding to the first mobile device;

determining a location-reporting status of the first mobile device, wherein the location-reporting status comprises one of a reporting state and a non-reporting state;

transmitting the device location to the communication network only when the location-reporting status is in the reporting state;

receiving, at the first mobile device, network data communicated from the communication network;

displaying, on the display of the first mobile device, an interactive map comprising a device symbol, one or more entity symbols, and one or more participant symbols,
  wherein the interactive map is at least partially based on the network data,
  wherein the device symbol corresponds to the location of the first mobile device,
  wherein the one or more entity symbols correspond to respective locations of entities, and
  wherein the one or more participant symbols correspond, respectively, to locations of one or more of the second mobile devices, each second mobile device being associated with a respective second identity corresponding to a respective second network participant;

transmitting a location update corresponding to a change in the device location of the first mobile device to the communication network only when the locating-reporting status is in the reporting state;

updating the interactive map to reflect the location update;

subsequent to joining the communication network, receiving a first message indicating a first remote control operation and a second message indicating a second remote control operation, the first and second messages each sent by a respective second device; and performing the first and second remote control operations indicated by the respective second devices based on the authorization granted when the first mobile device joined the network.

2. The method of claim 1, wherein the network data include georeferenced map data relating positions on the interactive map to spatial coordinates, and wherein the method further comprises:
  determining a first position on the interactive map of the device symbol based on the location of the first mobile device and on the georeferenced map data;
  determining one or more second positions on the interactive map of the one or more entity symbols, respectively, based on the respective locations of the one or more entities and on the georeferenced map data; and
  determining one or more third positions on the interactive map of the one or more participant symbols, respectively, based on the respective locations of the one or more second mobile devices and on the georeferenced map data,
  wherein displaying the interactive map comprises displaying the device symbol at the first position on the interactive map, displaying the one or more entity symbols on the interactive map at the one or more respective second positions, and displaying the one or more participant symbols on the interactive map at the one or more respective third positions.

3. The method of claim 1, wherein:
the reporting state enables communication of the device location to the communication network; and
the non-reporting state disables communication of the device location to the communication network.

4. The method of claim 3, wherein:
determining the location-reporting status of the first mobile device comprises determining whether at least one location-reporting criterion is satisfied, and
the location-reporting criterion is selected from the group consisting of: (1) passage of a predetermined time interval since transmitting the device location, and (2) displacement of the first mobile device by a predetermined distance relative to the device location.

5. The method of claim 1, wherein the operations further comprise:
  updating the one or more participant symbols on the interactive map upon receiving network data having updated location data for the one or more second mobile devices.

6. The method of claim 1, wherein the operations further comprise:
  generating one or more controls to control the interactive map; and
  responsive to receiving an activation of the one or more controls, causing at least one operation to be performed on the interactive map,
  wherein the at least one operation is selected from the group comprising: a zoom-in operation, a zoom-out operation, a grabbing operation, a panning operation, and a centering operation.

7. The method of claim 1, wherein the operations further comprise:
  generating a map switch control; and
  responsive to receiving an activation of the map switch control, causing the display to present a second map.

8. The method of claim 7, wherein:
causing the display to present a second map comprises switching the interactive map from a first map type to a second map type,
the first map type is selected from the group comprising: a georeferenced chart type, a satellite type, and an aerial photograph type, and
the second map type is different from the first map type and is selected from the group comprising: a georeferenced chart type, a satellite type, and an aerial photograph type.

9. The method of claim 1, wherein the operations further comprise:
  presenting a participant list comprising entries corresponding to the second network participants.

10. The method of claim 1, wherein the operations further comprise:
  upon receiving a selection of a first of the entity symbols, displaying information related to the entity corresponding to the first entity symbol,
  wherein the entity represents at least one type of entity selected from the group comprising: a business, a service, a non-participant, a vehicle, a building, a facility, an emergency service, a fixed entity, and a point of interest.

11. The method of claim 9, wherein the operations further comprise:
upon receiving a selection of data corresponding to a particular second mobile device, displaying options for communicating information to the selected second mobile device,
wherein the data corresponding to the particular second mobile device is a particular participant symbol on the interactive map, and
wherein communicating information to the selected second mobile device comprises performing an operation selected from the group comprising: sending a text message to the selected second mobile device, sending a multimedia message to the selected second mobile device, sending video to the selected second mobile device, and sending an image to the selected second mobile device.

12. The method of claim 9, wherein the operations further comprise:
upon receiving a selection of data corresponding to a particular second mobile device, displaying options for controlling the particular second mobile device,
wherein the particular second mobile device is associated with a particular second network participant, and
wherein the data corresponding to the particular second mobile device is a particular participant symbol on the interactive map.

13. A system comprising a first mobile device contained in a portable housing, the first mobile device comprising:
a touch screen display, non-transitory computer-readable media, and a central processing unit (CPU);
a mobile device transmitter communicatively coupled to the CPU;
a mobile device receiver communicatively coupled to the CPU; and
a global positioning system (GPS) receiver, communicatively coupled to the CPU, configured to receive a device location corresponding to the first mobile device;
wherein the CPU is configured to execute instructions to perform operations comprising:
associating the first mobile device with a first identity, wherein the first identity corresponds to a first network participant;
receiving a request to join a communication network, wherein the request is sent by one of a plurality of second mobile devices included in the communication network;
based on acceptance of the request, joining the communication network, wherein joining the network comprises granting authorization for the second mobile devices to repeatedly perform remote control operations on the first mobile device;
determining, by the CPU, a location-reporting status of the first mobile device, wherein the location-reporting status comprises one of a reporting state and a non-reporting state;
transmitting, by the mobile device transmitter, the device location received by the GPS receiver to the communication network only when the location-reporting status is in the reporting state;
receiving, by the mobile device receiver, network data communicated from the communication network;
displaying, on the touch screen display of the first mobile device, an interactive map comprising a device symbol, one or more entity symbols, and one or more participant symbols,
wherein the interactive map is at least partially based on the network data received by the mobile device receiver,
wherein the device symbol corresponds to the device location, received by the GPS receiver, of the first mobile device,
wherein the one or more entity symbols correspond to respective locations of entities, and
wherein the one or more participant symbols correspond, respectively, to the locations of the one or more of the second mobile devices, each second mobile device being associated with a respective second identity corresponding to a respective second network participant;
transmitting, by the mobile device transmitter, a location update corresponding to the change in the device location of the first mobile device to the communication network only when the locating-reporting status is in the reporting state;
updating, on the touch screen display, the interactive map to reflect the location update;
subsequent to joining the communication network, receiving a first message indicating a first remote control operation and a second message indicating a second remote control operation, the first and second messages each sent by a respective second device; and
performing the first and second remote control operations indicated by the respective second devices based on the authorization granted when the first mobile device joined the network.

14. The system of claim 13, wherein the network data include georeferenced map data relating positions on the interactive map to spatial coordinates, and wherein the operations further comprise:
determining a first position on the interactive map of the device symbol based on the location of the first mobile device and on the georeferenced map data;
determining one or more second positions on the interactive map of the one or more entity symbols, respectively, based on the respective locations of the one or more entities and on the georeferenced map data; and
determining one or more third positions on the interactive map of the one or more participant symbols, respectively, based on the respective locations of the one or more second mobile devices and on the georeferenced map data,
wherein displaying the interactive map comprises displaying the device symbol at the first position on the interactive map, displaying the one or more entity symbols on the interactive map at the one or more respective second positions, and displaying the one or more participant symbols on the interactive map at the one or more respective third positions.

15. The system of claim 13, wherein:
the reporting state enables communication of the device location to the communication network, and
the non-reporting state disables communication of the device location to the communication network.

16. The system of claim 13, wherein:
determining the location-reporting status of the first mobile device comprises determining whether at least one location-reporting criterion is satisfied, and
the location-reporting criterion is selected from the group consisting of: (1) passage of a predetermined time interval since transmitting the device location, and (2)

displacement of the first mobile device by a predetermined distance relative to the device location.

17. The system of claim 13, wherein the operations further comprise:
updating the one or more participant symbols on the interactive map upon receiving, by the mobile device receiver, network data having updated location data for the one or more second mobile devices.

18. The system of claim 13, wherein the operations further comprise:
generating one or more controls to control the interactive map; and
responsive to receiving, via the touch screen display, an activation of the one or more controls, causing at least one operation to be performed on the interactive map,
wherein the at least one operation is selected from the group comprising: a zoom-in operation, a zoom-out operation, a grabbing operation, a panning operation, and a centering operation.

19. The system of claim 13, wherein the operations further comprise:
generating a map switch control; and
responsive to receiving, via the touch screen display, an activation of the map switch control, causing the touch screen display to present a second map.

20. The system of claim 19, wherein:
causing the touch screen display to present a second map comprises switching the interactive map from a first map type to a second map type,
the first map type is selected from the group comprising: a geo-referenced chart type, a satellite type, and an aerial photograph type, and
the second map type is different from the first map type and is selected from the group comprising: a geo-referenced chart type, a satellite type, and an aerial photograph type.

21. The system of claim 13, wherein the operations further comprise:
presenting a participant list comprising entries corresponding to the second network participants.

22. The system of claim 13, wherein the operations further comprise:
upon receiving, via the touch screen display, a selection of a first of the entity symbols, displaying information related to the entity corresponding to the first entity symbol,
wherein the entity represents at least one type of entity selected from the group comprising: a business, a service, a non-participant, a vehicle, a building, a facility, an emergency service, a fixed entity, and a point of interest.

23. The system of claim 21, wherein the operations further comprise:
upon receiving, via the touch screen display, a selection of data corresponding to a particular second mobile device, displaying options for communicating information to the selected second mobile device,
wherein the data corresponding to the particular second mobile device is a particular participant symbol on the interactive map, and
wherein communicating information to the selected second mobile device comprises performing an operation selected from the group comprising: sending a text message to the selected second mobile device, sending a multimedia message to the selected second mobile device, sending a video to the selected second mobile device, and sending an image to the selected second mobile device.

24. The system of claim 21, wherein the operations further comprise:
upon receiving, via the touch screen display, a selection of data corresponding to a particular second mobile device, displaying options for controlling the particular second mobile device,
wherein the particular second mobile device is associated with a particular second network participant, and
wherein the data corresponding to the second mobile device is a particular participant symbol on the interactive map.

25. The method of claim 1, wherein joining the network further comprises obtaining authorization for the first mobile device to repeatedly perform remote control operations on the second mobile devices.

26. The system of claim 13, wherein joining the network further comprises obtaining authorization for the first mobile device to repeatedly perform remote control operations on the second mobile devices.

* * * * *